US012132244B2

(12) United States Patent
Wang et al.

(10) Patent No.: US 12,132,244 B2
(45) Date of Patent: Oct. 29, 2024

(54) PHASE SHIFTER AND ANTENNA

(71) Applicant: BOE TECHNOLOGY GROUP CO., LTD., Beijing (CN)

(72) Inventors: Xiyuan Wang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 363 days.

(21) Appl. No.: 17/605,021

(22) PCT Filed: Jan. 8, 2021

(86) PCT No.: PCT/CN2021/070799
§ 371 (c)(1),
(2) Date: Oct. 20, 2021

(87) PCT Pub. No.: WO2022/147747
PCT Pub. Date: Jul. 14, 2022

(65) Prior Publication Data
US 2023/0116249 A1 Apr. 13, 2023

(51) Int. Cl.
*H01P 1/18* (2006.01)

(52) U.S. Cl.
CPC .............. *H01P 1/181* (2013.01); *H01P 1/184* (2013.01)

(58) Field of Classification Search
None
See application file for complete search history.

(56) References Cited

U.S. PATENT DOCUMENTS 10,120,227 B2 11/2018 Yu et al.
2001/0017577 A1 8/2001 Toko
(Continued)

FOREIGN PATENT DOCUMENTS

CN 102437829 A 5/2012
CN 107004936 A 8/2017
(Continued)

OTHER PUBLICATIONS

Chang Liu:“Research on terahertz reflective phase shifter and antenna based on liquid crystal”, Mar. 2018, Master’s Thesis, HeFei University of Industry.
(Continued)

*Primary Examiner* — Anh Q Tran
(74) *Attorney, Agent, or Firm* — HOUTTEMAN LAW LLC

(57) ABSTRACT

The present disclosure provides a phase shifter and antenna. The phase shifter includes a first substrate, a second substrate and a first dielectric layer between the first substrate and the second substrate. The first substrate includes: a first base substrate and a transmission line on a side of the first base substrate proximal to the first dielectric layer. The second substrate includes: a second base substrate and a reference electrode on a side of the second substrate proximal to the first dielectric layer. An orthographic projection of the reference electrode on the first base substrate at least partially overlaps an orthographic projection of the transmission line on the first base substrate. The reference electrode is provided with a first opening therein, and a length of the first opening along the first direction is not less than a line width of the transmission line.

19 Claims, 11 Drawing Sheets

(56) References Cited

U.S. PATENT DOCUMENTS

| | | | | |
|---|---|---|---|---|
| 2019/0123454 | A1 | 4/2019 | Haziza et al. | |
| 2020/0243969 | A1 | 7/2020 | Fang et al. | |
| 2021/0005979 | A1* | 1/2021 | Chiu | H01Q 3/44 |
| 2021/0080765 | A1* | 3/2021 | Hu | H01P 1/184 |

FOREIGN PATENT DOCUMENTS

| | | | |
|---|---|---|---|
| CN | 107371279 | A | 11/2017 |
| CN | 107453013 | A | 12/2017 |
| CN | 108711669 | A | 10/2018 |
| CN | 108761862 | A | 11/2018 |
| CN | 108803096 | A | 11/2018 |
| CN | 208654481 | U | 3/2019 |
| CN | 110137636 | A | 8/2019 |
| CN | 110197939 | A | 9/2019 |
| CN | 209913001 | U | 1/2020 |
| CN | 210628497 | U | 5/2020 |
| CN | 210720940 | U * | 6/2020 |
| CN | 111668603 | A | 9/2020 |
| CN | 108563050 | B | 10/2020 |
| EP | 2575211 | A1 | 4/2013 |
| EP | 3609017 | A1 | 2/2020 |
| WO | 2010063307 | A1 | 6/2010 |
| WO | 2019228213 | A1 | 12/2019 |

OTHER PUBLICATIONS

European Patent Office, Search Report issued May 8, 2023 for application No. EP21916803.6.

China Patent Office, First Office Action issued Apr. 26, 2023 for application No. CN202111015609.2.

China Patent Office, First Office Action issued Apr. 5, 2023 for application No. CN202180000031.5.

Intellectual Property India, First Office Action issued Jan. 1, 2024 for application No. IN202217061006.

* cited by examiner

PHASE SHIFTER AND ANTENNA

TECHNICAL FIELD

The present disclosure belongs to the field of communication technology, and in particular, to a phase shifter and an antenna.

BACKGROUND

Phase shifters are devices used for changing the phase of an electromagnetic wave signal. An ideal phase shifter has very little insertion loss and almost has the same loss at various phase states to achieve the balance of the amplitude. The phase shifters include several types, such as electrically controlled phase shifters, optically controlled phase shifters, magnetically controlled phase shifters, and mechanically controlled phase shifters, etc. The basic function of the phase shifters is to change the transmission phase of the microwave signal by controlling the bias voltage. As an important component of a phased array antenna, the phase shifters are divided into a digital phase shifter and an analog phase shifter for controlling the phases of various signals in the array antenna so as to perform electric scanning with the radiation beam; and generally the phase shifters are used in a digital communication system as phase modulators.

SUMMARY

In order to solve at least one of the technical problems existing in the prior art, the present disclosure provides a phase shifter and an antenna.

As a first aspect, an embodiment of the present disclosure provides a phase shifter. The phase shifter includes a first substrate, a second substrate and a first dielectric layer between the first substrate and the second substrate. The first substrate includes a first base substrate and a transmission line on a side of the first base substrate proximal to the first dielectric layer. The second substrate includes: a second base substrate and a reference electrode on a side of the second base substrate proximal to the first dielectric layer. An orthographic projection of the reference electrode on the first base substrate at least partially overlaps an orthographic projection of the transmission line on the first base substrate.

A first opening is in the reference electrode, and a length of the first opening along a first direction is not less than a line width of the transmission line.

The transmission line includes a first transmission terminal, a second transmission terminal, and a transmission body portion. Each of the first transmission terminal and the second transmission terminal includes a first port and a second port arranged oppositely. The first port of the first transmission terminal and the first port of the second transmission terminal are connected to two opposite terminals of the transmission body portion, respectively. A direction from the first port to the second port of the first transmission terminal is the same as a direction from the first port to the second port of the second transmission terminal.

An extension direction of an orthographic projection of the second transmission terminal on the first base substrate passes through a center of an orthographic projection of the first opening on the first base substrate.

The transmission body portion includes at least one sinuous line electrically connected to the first transmission terminal and the second transmission terminal.

An orthographic projection of the at least one sinuous line on the first base substrate has a portion intersecting an extension direction of an orthographic projection of the first transmission terminal on the first base substrate.

The at least one sinuous line includes a plurality of sinuous lines, and at least a portion of the plurality of sinuous lines is different in shape.

An orthographic projection of the first opening on the first base substrate does not overlap the orthographic projection of the at least one sinuous line on the first base substrate.

A ratio of a length of the first opening along the first direction to a length of the first opening along a second direction is in a range from 1.7:1 to 2.3:1.

The first direction is perpendicular to the second direction.

A second opening is in the reference electrode, and a length of the second opening along the first direction is not less than the line width of the transmission line.

An orthographic projection of the second opening on the first base substrate does not overlap an orthographic projection of the first opening on the first base substrate.

An orthographic projection of the first transmission terminal on the first base substrate at least partially overlaps the orthographic projection of the second opening on the first base substrate.

An extension direction of the orthographic projection of the first transmission terminal on the first base substrate passes through a center of the orthographic projection of the second opening on the first base substrate.

The length of the second opening along the first direction is the same as the length of the first opening along the first direction, and a length of the second opening along the second direction is the same as a length of the first opening along the second direction.

The orthographic projection of the second opening on the first base substrate does not overlap an orthographic projection of the transmission body portion of the transmission line on the first base substrate.

The phase shifter further includes a first waveguide structure and a second waveguide structure. The first waveguide structure is configured to transmit a microwave signal in a coupling manner with the first transmission terminal of the transmission line through the second opening. The second waveguide structure is configured to transmit a microwave signal in a coupling manner with the second transmission terminal of the transmission line through the first opening.

A first port of the first waveguide structure is on a side of the first base substrate away from the first dielectric layer; and a first port of the second waveguide is on a side of the second base substrate away from the first dielectric layer.

The extension direction of the orthographic projection of the first transmission terminal on the first base substrate passes through a center of an orthographic projection of the first port of the first waveguide structure on the first base substrate; and/or an extension direction of an orthographic projection of the second transmission terminal on the second base substrate passes through a center of an orthographic projection of the first port of the second waveguide structure on the second base substrate.

A distance between the orthographic projection of the first transmission terminal on the first base substrate and the center of the orthographic projection of the first port of the first waveguide structure on the first base substrate is less than a preset value; and/or A distance between the orthographic projection of the second transmission terminal on the second base substrate and the center of the orthographic projection of the first port of the second waveguide structure on the second base substrate is less than a preset value.

The first waveguide structure includes a rectangular waveguide structure and has an aspect ratio in a range from 1.7:1 to 2.3:1 in cross-sectional view, and/or the second waveguide structure includes a rectangular waveguide structure and has an aspect ratio in a range from 1.7:1 to 2.3:1 in cross-sectional view.

The orthographic projection of the first port of the first waveguide structure on the first base substrate completely overlaps the orthographic projection of the first opening on the first base substrate.

The orthographic projection of the first port of the second waveguide structure on the second base substrate completely overlaps an orthographic projection of the second opening on the second base substrate.

The phase shifter has a microwave transmission region and a peripheral region surrounding the microwave transmission region. The second substrate further includes an isolation structure in the peripheral region on the second base substrate and surrounding the microwave transmission region.

The isolation structure is on a side of the reference electrode proximal to the second base substrate, and the reference electrode extends to the peripheral region and contacts and overlaps the isolation structure.

The reference electrode includes a groove in the peripheral region and an orthographic projection of the groove on the second base substrate overlaps an orthographic projection of the isolation structure on the second base substrate.

For a point, having a normal line with the normal line being intersected with other portions of the transmission line, on the transmission line, a distance from the point to a closest one of the intersections with the other portions of the transmission line is in a range from 100 μm to 2 mm.

A protective layer is on an inner wall of a hollow cavity of the first waveguide structure and/or a protective layer is on an inner wall of a hollow cavity of the second waveguide structure.

A filling medium is in the hollow cavity of the first waveguide structure, and/or a filling medium is in the hollow cavity of the second waveguide structure, and the filling medium includes polytetrafluoroethylene.

A material of the first dielectric layer includes a liquid crystal.

An antenna includes the phase shifter described above.

The antenna further includes a patch electrode on a side of the second base substrate away from the first dielectric layer. An orthographic projection of the patch electrode on the second base substrate overlaps an orthographic projection of the first opening on the second base substrate.

DETAILED DESCRIPTION

Figure 1:
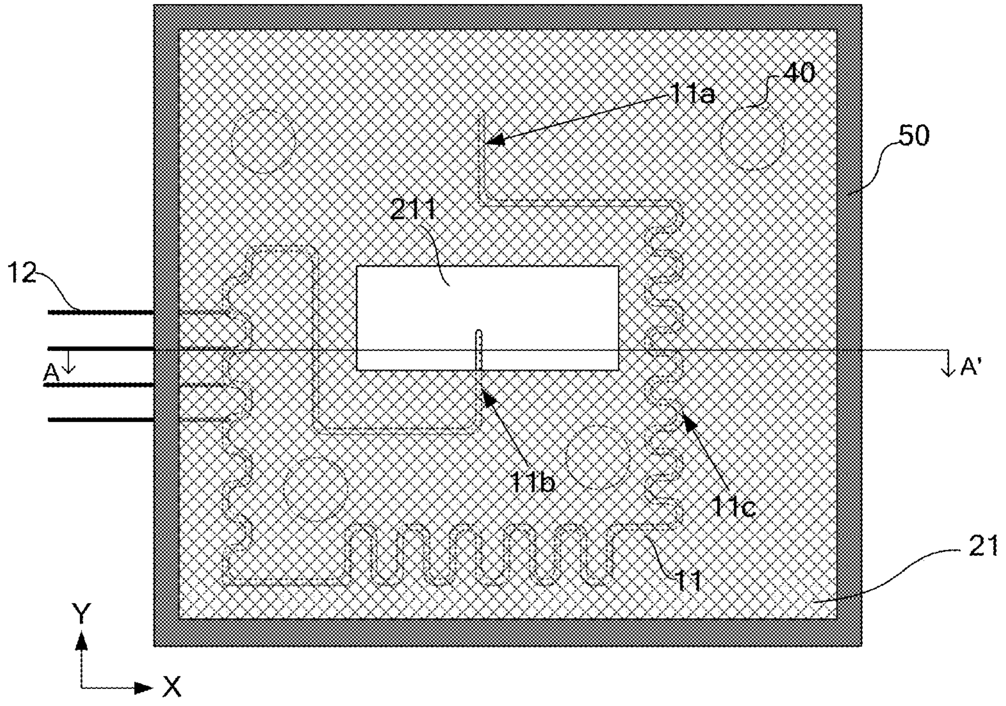
FIG. 1 is a schematic diagram showing a structure of a liquid crystal phase shifter according to an embodiment of the present disclosure.

In order to enable those skilled in the art to better understand the technical scheme of the disclosure, the disclosure is further described in detail below in combination with the accompanying drawings and specific embodiments.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "include" or "comprise", and the like, means that the element or item preceding the word comprises the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

Before describing the following embodiments, it should be noted that the first dielectric layer in the phase shifter provided in the following embodiments includes, but is not limited to, a liquid crystal layer, and the first dielectric layer being a liquid crystal layer is only taken as an example for illustration. The reference electrode in the phase shifter includes, but is not limited to, a ground electrode as long as it may form a current loop with the transmission line, and in the embodiment of the present disclosure, the reference electrode being a ground electrode is only taken as an example for illustration. When a first transmission terminal of the transmission line serves as a receiving terminal, a second transmission terminal of the transmission line serves as a transmission terminal; and when the second transmission terminal of the transmission line serves as a receiving terminal, the first transmission terminal of the transmission line serves as a transmission terminal. In the following description, the first transmission terminal of the transmission line is taken as a receiving terminal, and the second transmission terminal is taken as a transmission terminal for convenience of understanding.

In addition, the transmission line may be a delay line, a strip transmission line, or the like in the embodiment of the present disclosure. For convenience of description, the transmission line being a delay line is taken as an example for illustration in the embodiment of the present disclosure. The delay line has a shape including but not limited to any one of a bow shape, a wave shape, or a zigzag shape, or any combination thereof.

Figure 2:
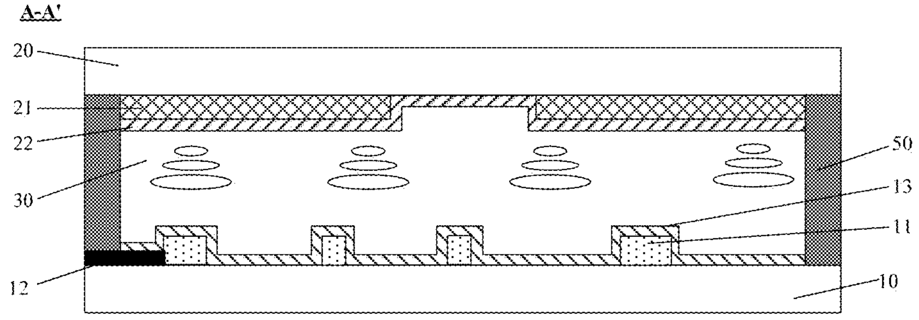
FIG. 2 is a cross-sectional view of the phase shifter shown in FIG. 1 taken along a line A-A'.

FIG. 1 is a schematic diagram showing a liquid crystal phase shifter according to an embodiment of the present disclosure, and FIG. 2 is a cross-sectional view of the phase shifter shown in FIG. 1 taken along a line A-A'. As shown in FIGS. 1 and 2, the liquid crystal phase shifter includes a first substrate and a second substrate disposed opposite to each other, and a liquid crystal layer 30 disposed between the first and second substrates. The first substrate includes a first base substrate 10, a transmission line 11 and a bias line 12 on a side of the first base substrate 10 proximal to the liquid crystal layer 30, and a first alignment layer 13 disposed on a side of the transmission line 11 and the bias line 12 away from the first base substrate 10. The second substrate includes a second base substrate 20, a ground electrode 21 disposed on a side of the second base substrate 20 proximal to the liquid crystal layer 30, and a second alignment layer 22 disposed on a side of the ground electrode 21 proximal to the liquid crystal layer 30. Of course, as shown in FIG. 1, the phase shifter not only includes the above-mentioned structure, but also includes a support structure 40 for maintaining the thickness of the cell (i.e., the cell thickness between the first substrate and the second substrate), and a frame sealing adhesive 50 for sealing the liquid crystal cell, and the like, which are not described herein.

Figure 3:
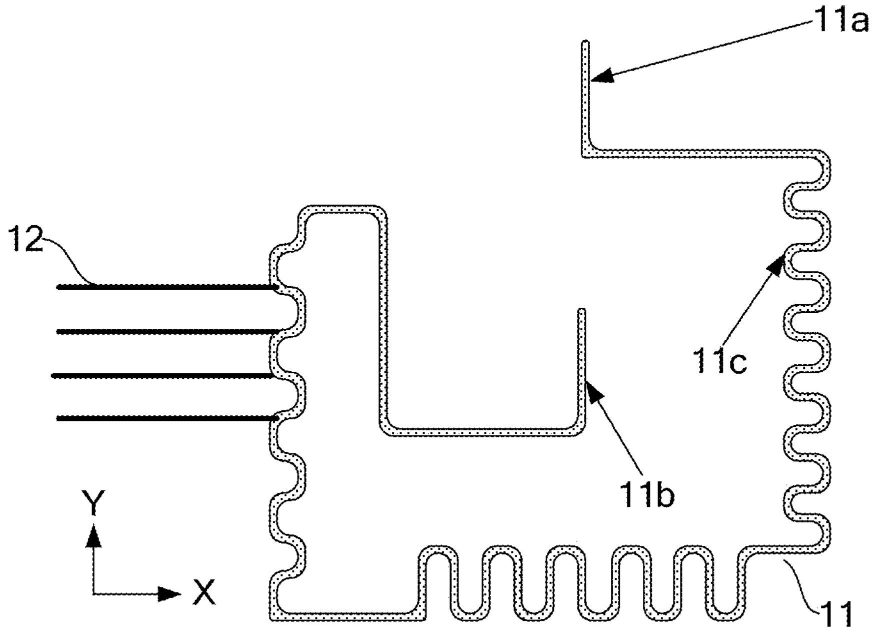
FIG. 3 is a plan view (on a side of a transmission line) of a first substrate in the phase shifter shown in FIG. 1.

FIG. 3 is a plan view (on a side of transmission line 11) showing the first substrate of the phase shifter shown in FIG. 1. As shown in FIG. 3, the transmission line 11 includes a first transmission terminal 11*a*, a second transmission terminal 11*b*, and a transmission body portion. Each of the first transmission terminal 11*a*, the second transmission terminal 11*b* and the transmission body portion 11*c* has a first port and a second port. The first port of the first transmission terminal 11*a* and the first port of the transmission body portion 11*c* are electrically connected to each other, and the first port of the second transmission terminal 11*b* and the second port of the transmission body portion 11*c* are electrically connected to each other. It should be noted that the first port and the second port are relative concepts, if the first port serves as the head port, the second port serves as the tail port; vice versa. In addition, in the embodiment of the present disclosure, the first port of the first transmission terminal 11*a* and the first port of the transmission body portion 11*c* are electrically connected to each other, and at this time, the first port of the first transmission terminal 11*a* and the first port of the transmission body portion 11*c* may be a common port. Accordingly, the first port of the second transmission terminal 11*b* and the second port of the transmission body portion 11*c* are electrically connected to each other, and the first port of the second transmission terminal 11*b* and the second port of the transmission body portion 11*c* may be a common port.

The transmission body portion 11*c* includes, but is not limited to, a sinuous line, and one or a plurality of sinuous lines may be provided. The sinuous line may be in a shape of, including but is not limited to, a bow, a wave, and the like.

In some embodiments, when the transmission main body portion 11*c* includes a plurality of sinuous lines, the shapes of at least a portion of the sinuous lines are different. That is, some of the plurality of sinuous lines may have the same shape, or each of the sinuous lines may have a different shape.

In some embodiments, a direction from the first port to the second port of the first transmission terminal 11*a* of the transmission line 11 is the same as a direction from the first port to the second port of the second transmission terminal 11*b*. In this case, the transmission main body portion 11*c* connected between the first transmission terminal 11*a* and the second transmission terminal 11*b* must have a wound portion, so that a space occupied by the transmission line 11 can be decreased. It should be noted here that although the transmission main body portion 11*c* has the wound portion, no overlap occurs in the wound portion.

In some embodiments, the transmission body portion 11*c* of the transmission line 11 includes at least one sinuous line electrically connected to the first transmission terminal 11*a* and the second transmission terminal 11*b*. An orthographic projection of the at least one sinuous line on the first base substrate has a portion intersecting with an extension direction of an orthographic projection of the first transmission terminal 11*a* on the first base substrate 10. In this case, the space occupied by the transmission line 11 can be decreased so as decrease a volume of the phase shifter.

In some embodiments, when the transmission body portion 11*c* of the transmission line 11 includes at least one sinuous line, an orthographic projection of the first opening 211 of the ground electrode 21 on the first base substrate 10 does not overlap an orthographic projection of the at least one sinuous line on the first base substrate 10. For example, an orthographic projection of the first opening 211 of the ground electrode 21 on the first base substrate 10 does not overlap an orthographic projection of each of the sinuous lines on the first base substrate 10, thereby avoiding loss of the microwave signal.

In some embodiments, when the first transmission terminal 11*a* serves as a receiving terminal of the microwave signal, the second transmission terminal 11*b* serves as a transmission terminal of the microwave signal; accordingly, when the second transmission terminal 11*b* serves as a receiving terminal of the microwave signal, the first transmission terminal 11*a* serves as a transmission terminal of the microwave signal. The bias line 12 is electrically connected to the transmission line 11 and configured to apply a DC bias signal to the transmission line 11 so as to form a DC steady-state electric field between the transmission line 11 and the ground electrode 21. Microscopically, the liquid crystal molecules of the liquid crystal layer 30 are deflected due to the force of the electric field. Macroscopically, a dielectric constant of the liquid crystal layer 30 changes, that is, when a microwave signal is transmitted between the transmission line 11 and the ground electrode 21, the dielectric constant of the liquid crystal layer 30 changes, so that a phase of the microwave signal changes accordingly. Specifically, a variation amount of the phase of the microwave signal is positively correlated with the deflection angle of the liquid crystal molecules and the strength of the electric field, that is to say, the phase of the microwave signal may be changed by applying a DC bias voltage, which is the working principle of the liquid crystal phase shifter.

Figure 4:
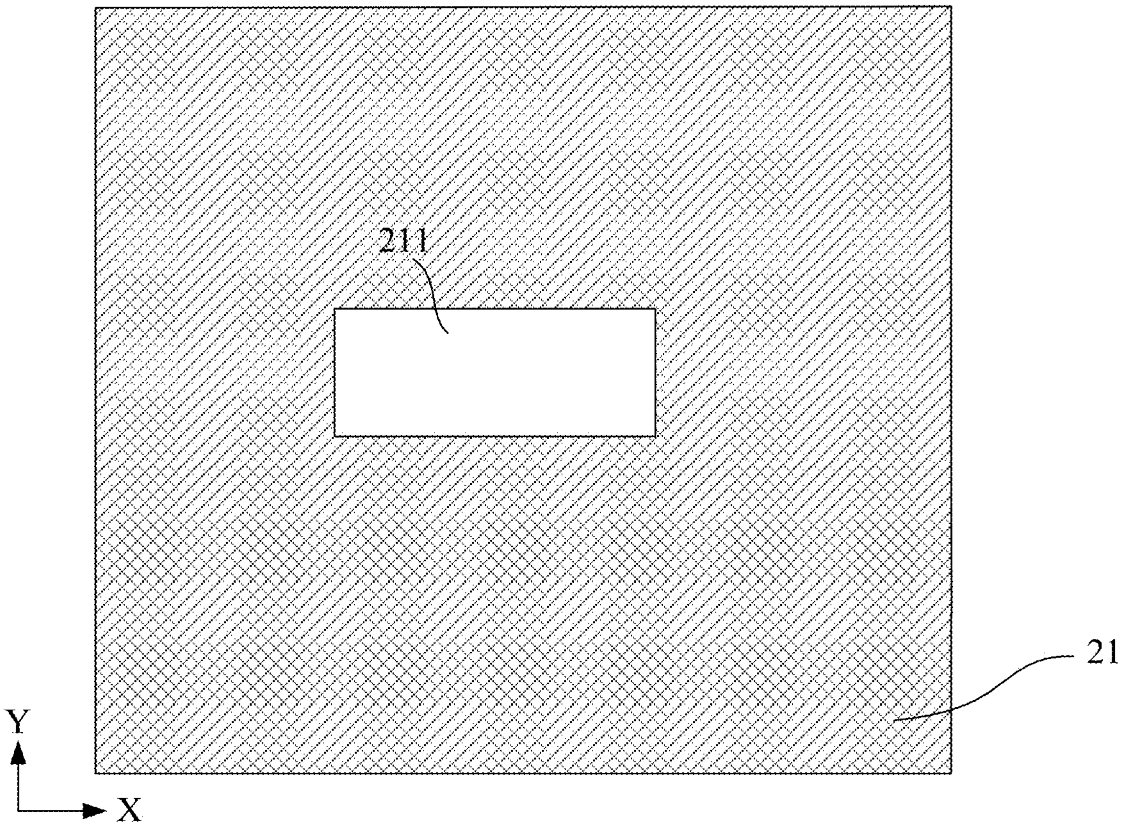
FIG. 4 is a plan view (on a side of a ground electrode) of a second substrate in the phase shifter shown in FIG. 1.

FIG. 4 is a plan view (on a side of the ground electrode 21) showing a second substrate of the phase shifter shown in FIG. 1. As shown in FIG. 4, a first opening 211 used for radiation of microwave signals is formed in the ground electrode 21, and a length of the first opening 211 along a first direction is not less than a line width of the delay line. The first direction refers to a direction perpendicular to an extension direction of the second transmission terminal 11*b* of the transmission line 11, i.e., the X direction in FIG. 4. A length of the first opening 211 in the ground electrode 21 along the first direction refers to the maximum length of the first opening 211 along the X direction in FIG. 4. With continued reference to FIG. 1, an orthographic projection of the transmission line 11 on the first base substrate 10 at least partially overlaps an orthographic projection of the ground electrode 21 on the first base substrate 10, and an orthographic projection of the second transmission terminal 11*b* of the transmission line 11 at least partially overlaps an orthographic projection of the first opening 211 in the ground electrode 21 on the first base substrate 10. With the above arrangement, the microwave signal can be coupled out of the liquid crystal phase shifter through the first opening 211 in the ground electrode 21 or coupled into the liquid crystal phase shifter through the first opening 211 in the ground electrode 21.

Figure 5:
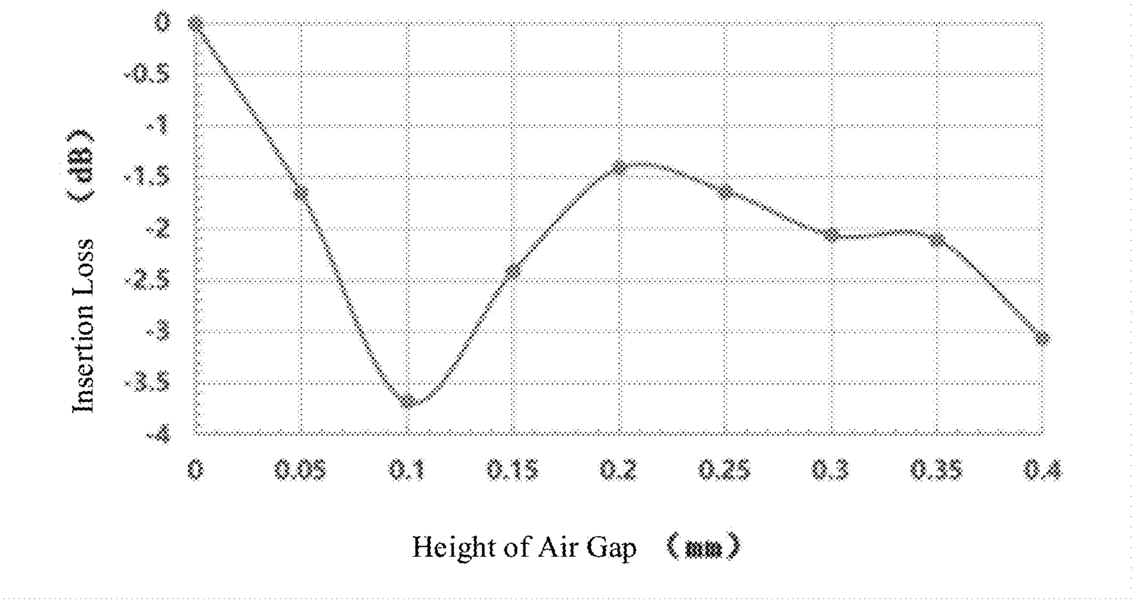
FIG. 5 is a graph showing a variation of a height of an air gap with an insertion loss of the liquid crystal phase shifter.

In the related art, a microwave signal is fed into and out of the liquid crystal phase shifter by coupling the transmission line 11 of the liquid crystal phase shifter to a metal microstrip line on a Printed Circuit Board (PCB). When the PCB and a glass substrate of the liquid crystal phase shifter are assembled in an engineering practice, an air gap is introduced due to factors such as a height of the metal microstrip line, and the heights of the air gaps at various positions are different. The coupling structure is a capacitive structure, and is sensitive to the thickness of the air gap. The random tiny change of the thickness of the air gap can result in the change of the coupling efficiency, and in turn the amplitude of the microwave signal is greatly changed, namely the insertion loss is greatly changed. FIG. 5 is a curve chart showing a change of the height of the air gap and the insertion loss of the liquid crystal phase shifter. As shown in FIG. 5, the maximum insertion loss is 3.7 dB. Since the high-gain antenna adopts a design of an array, namely the liquid crystal phase shifters are arranged in an array, the performance of the antenna is reduced (i.e., the gain of the main lobe is decreased, and the gain of the auxiliary lobe is increased) due to the difference in the amplitude among the liquid crystal phase shifters.

Figure 6:
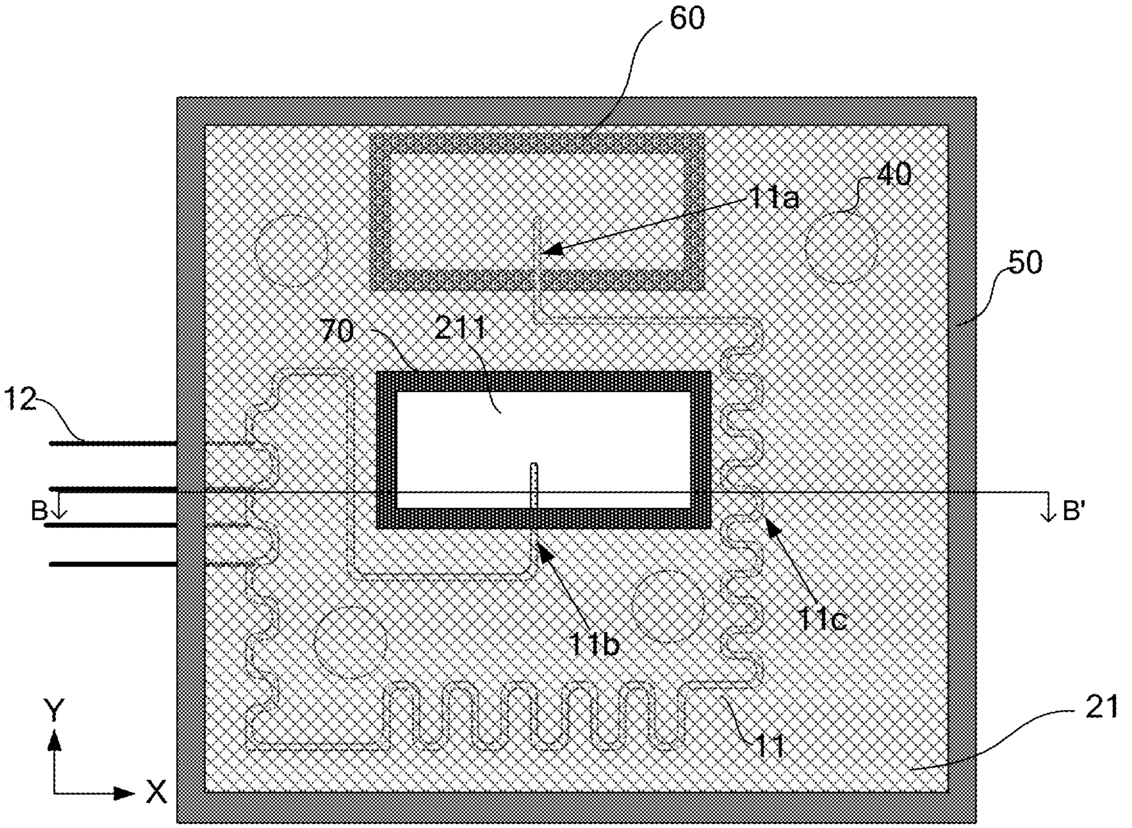
FIG. 6 is a schematic diagram showing another phase shifter according to an embodiment of the present disclosure.
Figure 7:
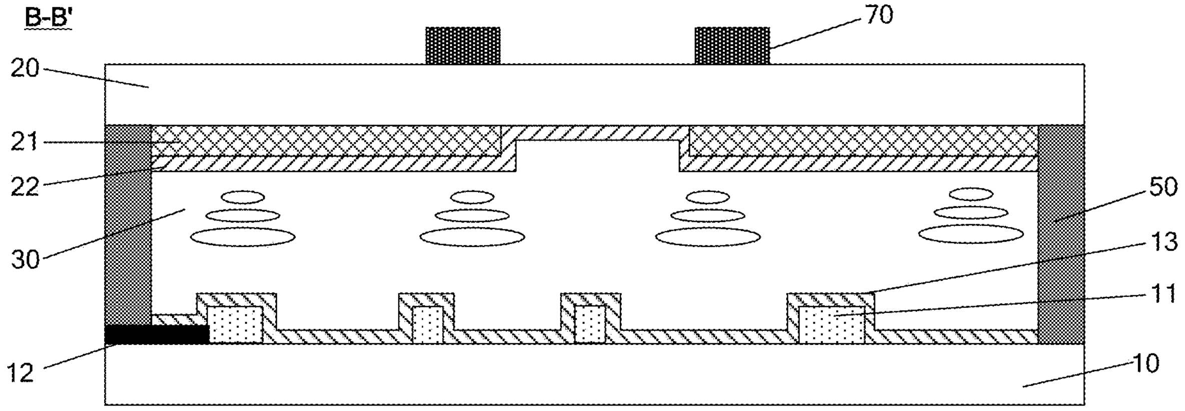
FIG. 7 is a sectional view of the phase shifter shown in FIG. 6 taken along a line B-B'.
Figure 8:
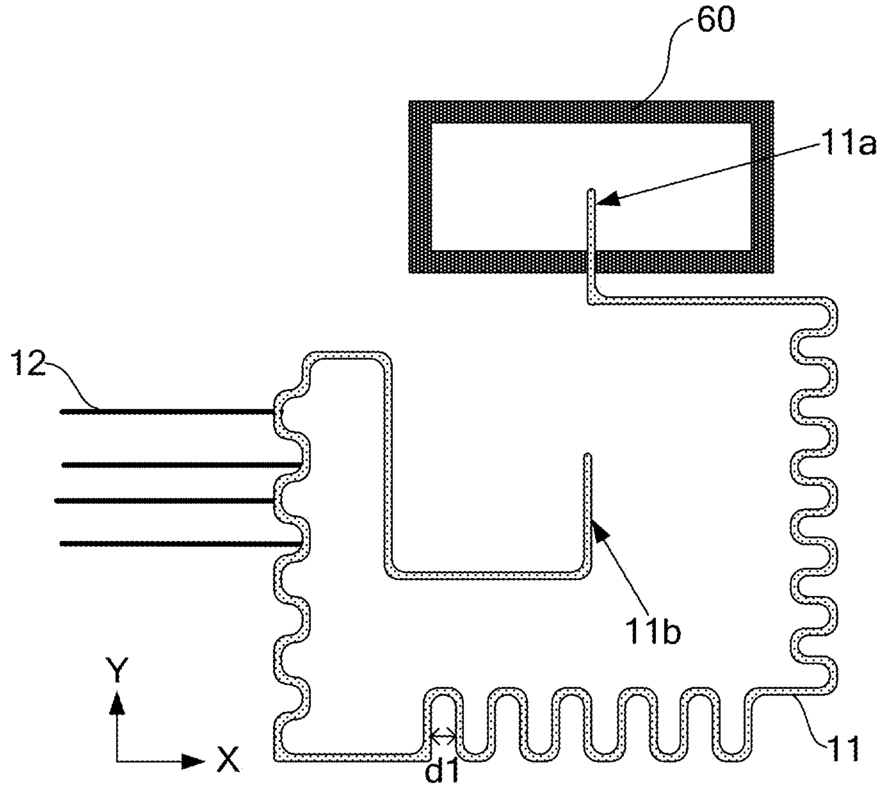
FIG. 8 is a plan view (on a side of a transmission line) of a first substrate in the phase shifter shown in FIG. 6.
Figure 9:
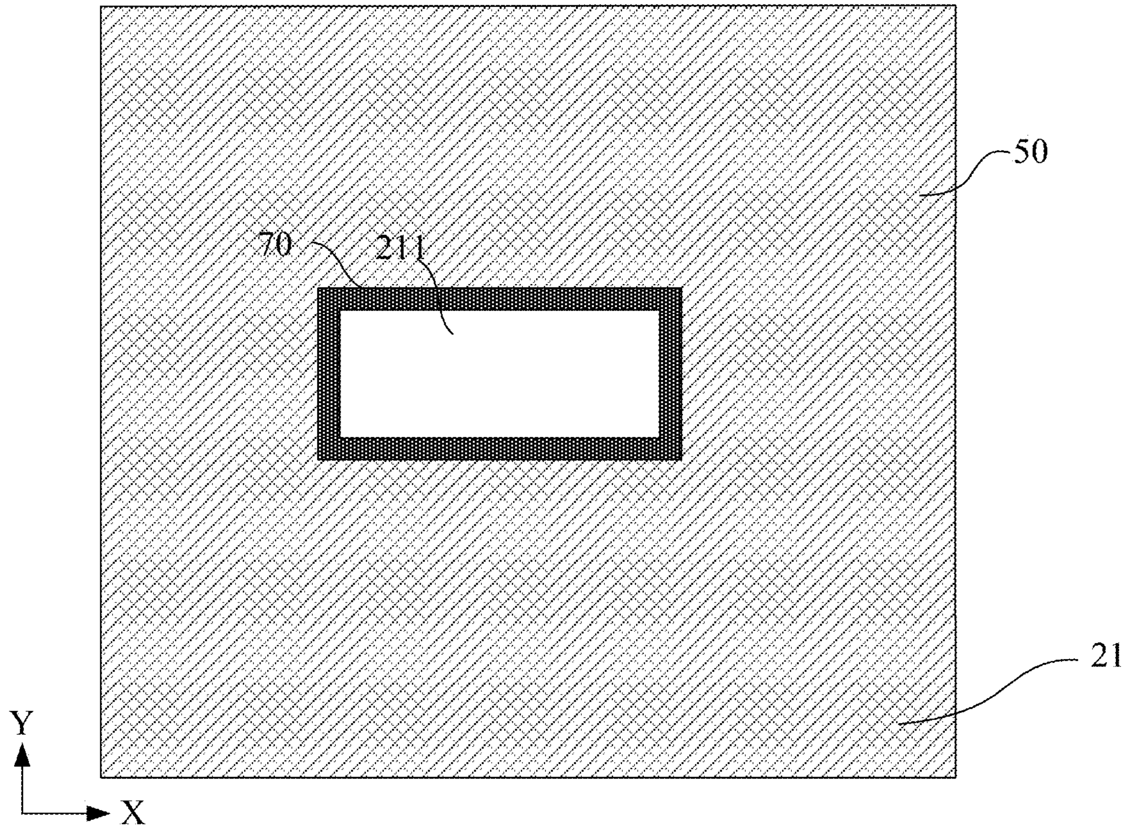
FIG. 9 is a plan view (on a side of a ground electrode) of a second substrate in the phase shifter shown in FIG. 6.

In view of the above problems, an embodiment of the present disclosure further provides a phase shifter. FIG. 6 is a schematic diagram showing another phase shifter according to an embodiment of the present disclosure; FIG. 7 is a cross-sectional view of the phase shifter shown in FIG. 6 taken along a line B-B'; FIG. 8 is a plan view (on a side of the transmission line) of the first substrate in the phase shifter shown in FIG. 6; and FIG. 9 is a plan view (on a side of the ground electrode) of the second substrate in the phase shifter shown in FIG. 6. As shown in FIGS. 6 to 9, the phase shifter has a microwave transmission region and a peripheral region surrounding the microwave transmission region. The phase shifter includes a first substrate, a second substrate and a liquid crystal layer 30, wherein the first substrate and the second substrate are oppositely arranged, and the liquid crystal layer is arranged between the first substrate and the second substrate and is located in the microwave transmission region. The liquid crystal phase shifter in the embodiment of the present disclosure further includes a first waveguide structure 60 and a second waveguide structure 70 located in the microwave transmission region. The first waveguide structure 60 is located on a side of the first substrate away from the liquid crystal layer 30, and the second waveguide structure 70 is on a side of the second substrate away from the liquid crystal layer 30. The first substrate and the second substrate in the embodiment of the present disclosure may have the same structure as the first substrate and the second substrate of the liquid crystal phase shifter in FIG. 1, that is, the first substrate includes a first base substrate 10, and a transmission line 11, a bias line 12, and a first alignment layer 13 on the first base substrate 10. The second substrate includes a second base substrate 20, and a ground electrode 21 and a second alignment layer on the second base substrate 20. The first waveguide structure 60 is configured to transmit the microwave signal in a coupling manner to the first transmission terminal 11*a* of the transmission line 11. The second waveguide structure 70 is configured to transmit the microwave signal in a coupling manner to the second transmission terminal 11*b* of the transmission line 11 through the first opening 211 in the ground electrode 21.

Specifically, when the first transmission terminal 11*a* of the transmission line 11 serves as a receiving terminal and the second transmission terminal 11*b* of the transmission line 11 serves as a transmission terminal, the first waveguide structure 60 transmits the microwave signal to the first transmission terminal 11*a* of the transmission line 11 in a coupling manner. At this time, the microwave signal is transmitted between the transmission line 11 and the ground electrode 21, and a DC steady-state electric field is formed between the transmission line 11 and the ground electrode 21 due to the DC bias voltage applied to the bias line 12, so that the liquid crystal molecules are deflected, and in turn the dielectric constant of the liquid crystal layer 30 is changed. Since the dielectric constant of the liquid crystal layer 30 changes when the microwave signal is transmitted between the transmission line 11 and the ground electrode 21, the phase of the microwave signal is changed. After the phase of the microwave signal is shifted, the phase-shifted microwave signal is coupled to the second waveguide structure 70 via the second transmission terminal 11*b* of the transmission line 11 and the first opening 211 in the ground electrode 21, and is radiated out of the phase shifter.

In some embodiments, a ratio of the length of the first opening 211 in the ground electrode 21 along the X direction to the length of the first opening 211 along the Y direction is in a range from 1.7:1 to 2.3:1. Of course, the length of the first opening 211 along the X direction and the length of the first opening 211 along the Y direction may also be determined according to the line width of the first transmission terminal 11*a* of the transmission line 11 and a size of the first port of the first waveguide structure 60 connected to the first substrate. It should be noted that, in the embodiments of the present disclosure, the phase shifter further includes a first wiring board and a second wiring board. The first wiring board is bonded to the first substrate and configured to supply a DC bias voltage to the bias line 12. The second wiring board is bonded to the second substrate and configured to supply a ground signal to the ground electrode 21.

Each of the first wiring board and the second wiring board may include various types of wiring boards, such as a Flexible Printed Circuit (FPC) or a Printed Circuit Board (PCB), and the like, which is not limited herein. The first wiring board may include at least one first pad thereon, with one end of the bias line 12 being connected to (i.e., bonded to) the first pad, the other end of the bias line 12 being connected to the transmission line 11. The second wiring board may also include at least one second pad thereon, and the second wiring board is electrically connected to the ground electrode 21 through the second connection pad.

In the embodiment of the present disclosure, a microwave signal is fed into between the transmission line 11 and the ground electrode 21 through the first waveguide structure 60 to shift the phase of the microwave signal, and the phase-shifted microwave signal is radiated out of the phase shifter through the second waveguide structure 70, that is, the first waveguide structure 60 and the second waveguide structure 70 serve as the feeding structure of the phase shifter. Since each of the first waveguide structure 60 and the second waveguide structure 70 generally has a metal hollow structure, the air gap is not easily generated during the assembling process of the phase shifter, and the coupling efficiency of the microwave signal can be effectively improved. Meanwhile, when the phase shifter in the embodiment of the present disclosure is applied to a liquid crystal phased array antenna, the consistency of the amplitudes among various channels of the antenna can be improved, and the insertion loss can be reduced.

Figure 10:
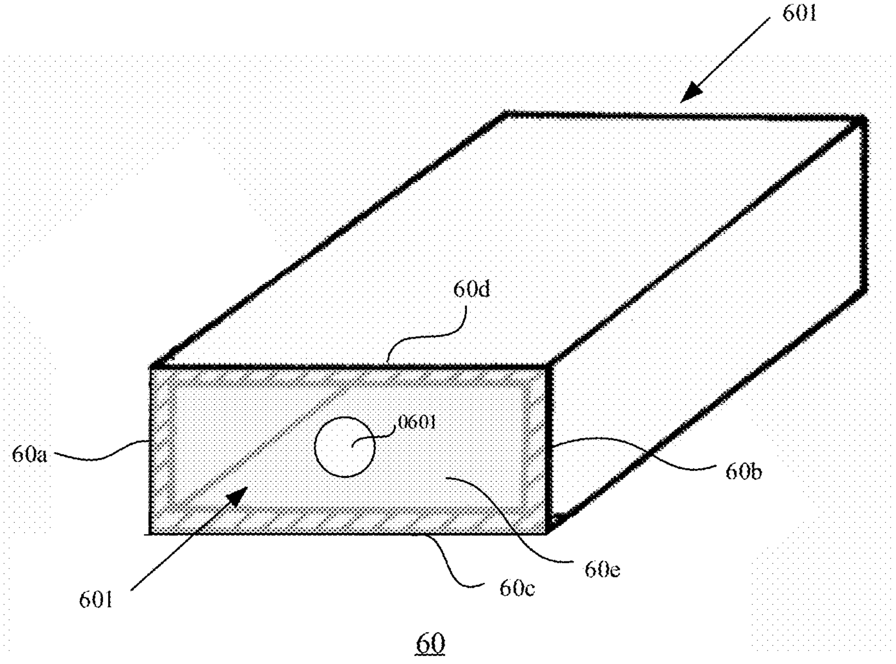
FIG. 10 is a schematic diagram of a first waveguide structure according to an embodiment of the present disclosure.

In some embodiments, each of the first waveguide structure 60 and the second waveguide structure 70 may include hollow metal walls. Specifically, the first waveguide structure 60 may include at least one first sidewall that connects to form a waveguide cavity of the first waveguide structure 60, and/or the second waveguide structure 70 may include at least one second sidewall that connects to form a waveguide cavity of the second waveguide structure 70. If the first waveguide structure 60 includes only one first sidewall, the first waveguide structure 60 is a circular waveguide structure, and a circular hollow pipe formed by the first sidewall constitutes the waveguide cavity of the first waveguide structure 60. The first waveguide structure 60 may also include a plurality of first side walls to form the waveguide cavities in various shapes. For example, FIG. 10 is a schematic view showing a first waveguide structure 60 according to an embodiment of the present disclosure. The first waveguide structure 60 may include four sidewalls, namely a first sidewall 60*a*, a second sidewall 60*b*, a third sidewall 60*c*, and a fourth sidewall 60*d*. The first sidewall 60*a* is disposed opposite to the second sidewall 60*b*, and the third sidewall 60*c* is disposed opposite to the fourth sidewall 60*d*. The four sidewalls are connected to form a rectangular waveguide cavity 601, so that the first waveguide structure 60 is a rectangular waveguide. It should be noted that the second port of the first waveguide structure 60 may include a bottom surface 60*e* covering the entire of the second port. The bottom surface 60*e* has an opening 0601 which is matched with one end of a signal connector. The signal connector is inserted into the first waveguide structure 6060 through the opening, and the other end of the signal connector is connected to an external signal line to input a signal into the first waveguide structure 60. Of course, the second port of the second waveguide structure 70 may also be disposed on any one of the sidewalls, that is, the opening 0601 may be formed on any one of the first sidewall 60*a*, the second sidewall 60*b*, the third sidewall 60*c* and the fourth sidewall 60*d*, which are defined in the embodiments of the present disclosure.

The second waveguide structure 70 has the same structure as the first waveguide structure 60. If the second waveguide structure 70 has only one sidewall, the second waveguide structure 70 is a circular waveguide structure. If the second waveguide structure 70 includes a plurality of sidewalls, the plurality of sidewalls enclose to form the second waveguide structure 70 with a corresponding shape. In the following description, an embodiment in which the first waveguide structure 60 and the second waveguide structure 70 are rectangular waveguides is illustrated, but the present disclosure is not limited thereto.

In some embodiments, when each of the first waveguide structure 60 and the second waveguide structure 70 is a rectangular waveguide, a length ratio in respective cross-sectional views may be in the range from 1.7:1 to 2.3:1. For example, the rectangular waveguide has an aspect ratio of 2:1, and a length for the Ku waveguide of about 12 mm to 19 mm. It should be noted that a thickness of the first sidewall of the first waveguide structure 60 may be 4 times to 6 times a skin depth of the microwave signal transmitted by the phase shifter. A thickness of the second sidewall of the second waveguide structure 70 may be 4 times to 6 times a skin depth of the microwave signal transmitted by the phase shifter, which is not limited herein.

In some embodiments, the first waveguide structure 60 and/or the second waveguide structure 70 have a protective layer formed on the inner wall of the hollow structure (e.g., the waveguide cavity 601) thereof. For example, a thin gold layer is formed on the inner wall of the hollow structure through an electroplating process as a protective layer, so that the inner wall of the hollow structure is prevented from being oxidized.

In some embodiments, the hollow structure of the first waveguide structure 60 and/or the second waveguide structure 70 has a filling medium therein, which is a dielectric medium with a high dielectric constant, so as to decrease the size of the waveguide structure. The filling medium includes but is not limited to teflon, or ceramic; of course, the filling medium may also be air.

Figure 11:
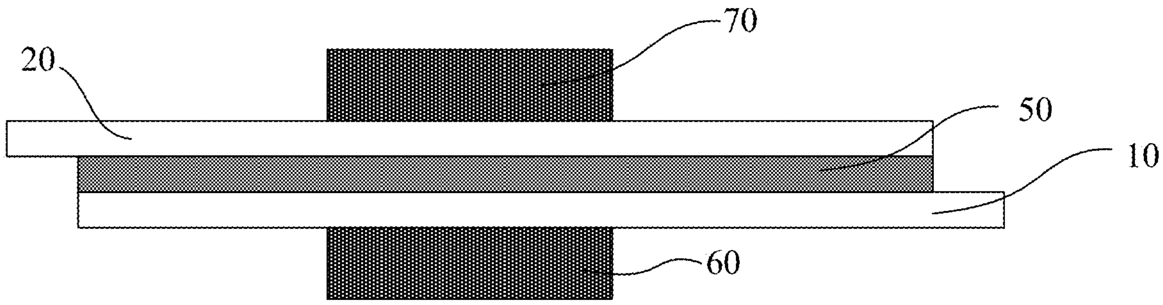
FIG. 11 is a front view of the phase shifter shown in FIG. 6.

FIG. 11 is a front view of the phase shifter shown in FIG. 6. In some embodiments, the first waveguide structure 60 and the second waveguide structure 70 may have the same size and the same shape. In this case, the input coupling efficiency of the microwave signal can be uniform with the output coupling efficiency of the microwave signal. Of course, in some embodiments, the first waveguide structure 60 and the second waveguide structure 70 may also be different in at least one of the size and shape.

In some embodiments, the first port of the first waveguide structure 60 is fixed on a side of the first base substrate 10 away from the liquid crystal layer 30, and an orthographic projection of the first port of the first waveguide structure 60 on the first base substrate 10 overlaps an orthographic projection of the first transmission terminal 11*a* of the transmission line 11 on the first base substrate 10, so that the microwave signal can be transmitted between the first waveguide structure 60 and the first transmission terminal 11*a* of the transmission line 11 in a coupling manner; and/or the first port of the second waveguide structure 70 is fixed on a side of the first base substrate 10 away from the liquid crystal layer 30, and an orthographic projection of the first port of the second waveguide structure 70 on the second base substrate 20, an orthographic projection of the first opening 211 in the ground electrode 21 on the second base substrate 20, and an orthographic projection of the second transmission terminal 11*b* of the transmission line 11 on the second base substrate 20 overlap with each other, so that the microwave signal can be transmitted between the second waveguide structure 70 and the second transmission terminal 11*b* of the transmission line 11 in a coupling manner.

Figure 12:
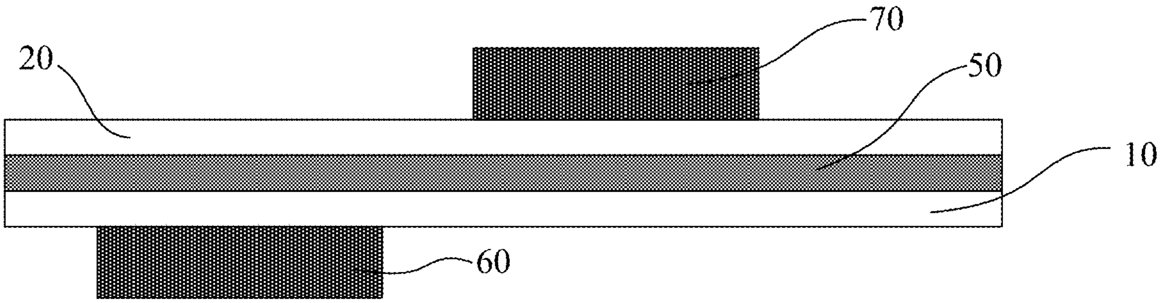
FIG. 12 is a side view (viewed from the left or right side) of the phase shifter shown in FIG. 6.

For example, FIG. 12 is a side view (as viewed from the left or right side) of the phase shifter shown in FIG. 6. As shown in FIG. 12, the first waveguide structure 60 and the second waveguide structure 70 may be disposed on opposite sides, i.e., the first waveguide structure 60 is disposed on a side of the first base substrate 10 away from the liquid crystal layer 30, and the second waveguide structure 70 is disposed on a side of the second base substrate 20 away from the liquid crystal layer 30. In this case, an orthographic projection of the first waveguide structure 60 on the second base substrate 20 does not overlap an orthographic projection of the second waveguide structure 70 on the second base substrate 20, so as to ensure that the structure of the first waveguide structure 60 is independent from and does not influenced by the second waveguide structure 70.

In an embodiment, the first port of the second waveguide structure 70 may completely overlap the first opening 211 in the ground electrode 21 for precise transmission of the microwave signal. Of course, in the embodiment of the present disclosure, an orthographic projection of the first port of the second waveguide structure 70 on the second base substrate 20 may cover an orthographic projection of the first opening 211 in the ground electrode 21 on the second base substrate 20. In this case, an area of the first opening 211 in the ground electrode 21 is smaller than an area of the first port of the second waveguide structure 70.

In some embodiments, with continued reference to FIG. 6, an extension direction of an orthographic projection of the first transmission terminal 11*a* of the delay line on the first base substrate 10 runs through a center of an orthographic projection of the first port of the first waveguide structure 60 on the first base substrate 10. For example, the first transmission terminal 11*a* of the delay line extends along the Y direction and passes through the center of the first port of the first waveguide structure 60. When the first port of the first waveguide structure 60 is the rectangular first opening 211, the center of the first port of the first waveguide structure 60 is an intersection of two diagonal lines of the first port. When the first port of the first waveguide structure 60 is circular, the center of the first port of the first waveguide structure 60 is the center of the circle of the first port. In this case, an orthographic projection of the first transmission terminal 11*a* of the delay line on the first base substrate 10 is inserted into the first port of the first waveguide structure 60, so as to facilitate the radiation of the microwave signal output from the first port of the first waveguide structure 60 to the first transmission terminal 11*a* of the delay line, so that the microwave signal transmits between the delay line and the ground electrode 21. Accordingly, in the embodiment of the present disclosure, an extension direction of an orthographic projection of the second transmission terminal 11*b* of the delay line on the second base substrate 20 passes through a center of an orthographic projection of the first port of the second waveguide structure 70 on the first base substrate 10. For example, the second transmission terminal 11*b* of the delay line extends along the Y direction and penetrates through the center of the first port of the second waveguide structure 70. In this case, an orthographic projection of the second transmission terminal 11*b* of the delay line on the second base substrate 20 is inserted into the first port of the second waveguide structure 70, so that the microwave signal is coupled to the second waveguide structure 70 via the second transmission terminal 11*b* of the delay line to radiate the microwave signal out of the phase shifter.

In an embodiment, a distance between an orthographic projection of the first transmission terminal 11*a* of the delay line on the first base substrate 10 and a center of an orthographic projection of the first port of the first waveguide structure 60 on the first base substrate 10 is less than a preset value of 2.5 mm. Preferably, a distance between an orthographic projection of the first transmission terminal 11*a* on the first base substrate 10 and a center of an orthographic projection of the first port of the first waveguide structure 60 on the first base substrate 10 is 0; that is, an orthographic projection of the port of the first transmission terminal 11*a* on the first base substrate 10 is located at a center of an orthographic projection of the first port of the first waveguide structure 60 on the first base substrate 10. The reason for this arrangement is that in this case, the coupling efficiency of the first waveguide structure 60 and the delay line is maximum, and the insertion loss of the microwave signal is minimal. Accordingly, a distance between an orthographic projection of the second transmission terminal 11*b* of the delay line on the second base substrate 20 and a center of an orthographic projection of the first port of the second waveguide structure 70 on the second base substrate 20 is also smaller than a preset value of 2.5 mm. Preferably, a distance between an orthographic projection of the second transmission terminal 11*b* on the second base substrate 20 and a center of an orthographic projection of the first port of the second waveguide structure 70 on the second base substrate 20 is 0; that is, an orthographic projection of the second transmission terminal 11*b* on the second base substrate 20 overlaps a center of an orthographic projection of the first port of the second waveguide structure 70 on the second base substrate 20. The reason for this arrangement is that in this case, the coupling efficiency of the second waveguide structure 70 and the delay line is maximum, and the insertion loss of the microwave signal is minimal. In some embodiments, the present disclosure further includes a signal connector, one end of the signal connector is connected to an external signal line, and the other end of the signal connector is connected to the second port of the first waveguide structure 60 so as to input a microwave signal into the first waveguide structure 60, and then the first waveguide structure 60 couples the microwave signal to the transmission line 11. The signal connector may be various types, such as SMA connector, etc., which is not limited herein. Of course, the phase shifter according to the embodiment of the present disclosure may further include a third substrate connected to the second port of the first waveguide structure 60. The third substrate includes a third base substrate and a feeding transmission line 11. The third base substrate is connected to the second port of the first waveguide structure 60, and the feeding transmission line 11 is disposed on a side of the third base substrate proximal to the first waveguide structure 60. A first end of the feeding transmission line 11 extends to an edge of the third base substrate and is connected to an external signal line. Specifically, the signal connector may be disposed on an edge of the third base substrate, with one end of the signal connector being connected to the feeding transmission line 11, and the other end of the signal connector being connected to the external signal line, so as to input a signal to the feeding transmission line 11. The second end of the feeding transmission line 11 extends to the second port of the first waveguide structure 60 to feed the signal into the waveguide cavity of the first waveguide structure 60, and the first waveguide structure 60 in turn couples the signal to the first feeding structure via the first port of the first waveguide structure 60. In particular, the second end of the feeding transmission line 11 may extend into the second port of the first waveguide structure 60, that is, an orthographic projection of the second end of the feeding transmission line 11 on the first base substrate 10 is within an orthographic projection of the second port of the first waveguide structure 60 on the first base substrate 10.

Figure 13:
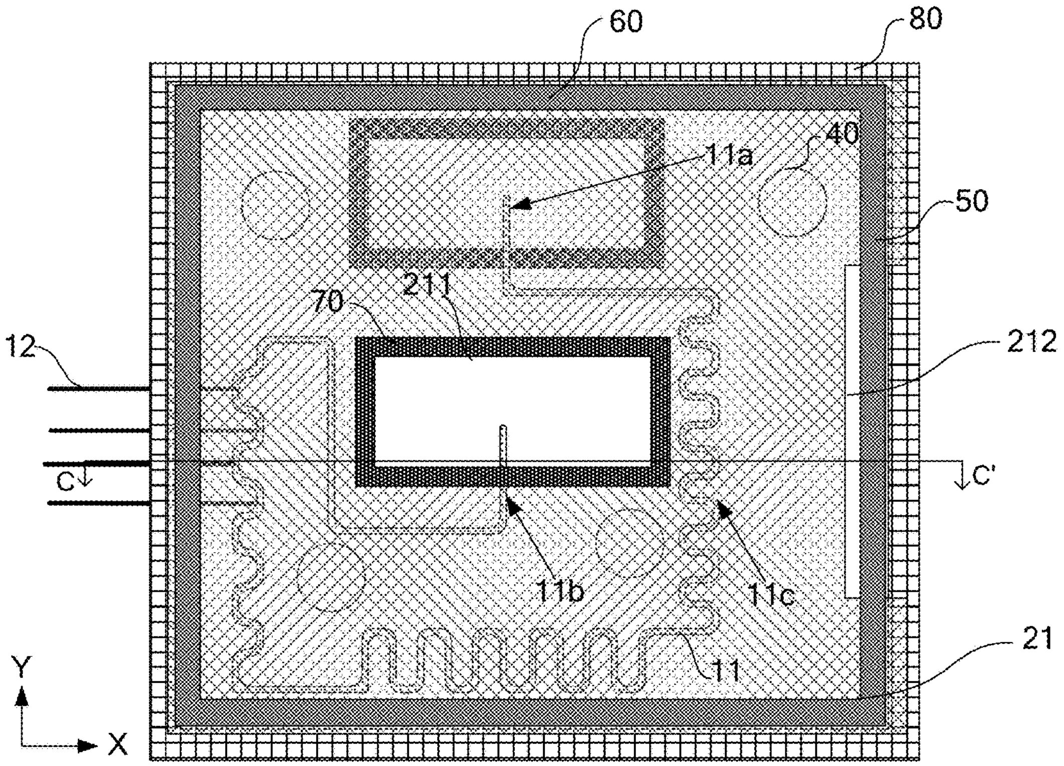
FIG. 13 is a schematic diagram showing another phase shifter according to an embodiment of the present disclosure.
Figure 14:
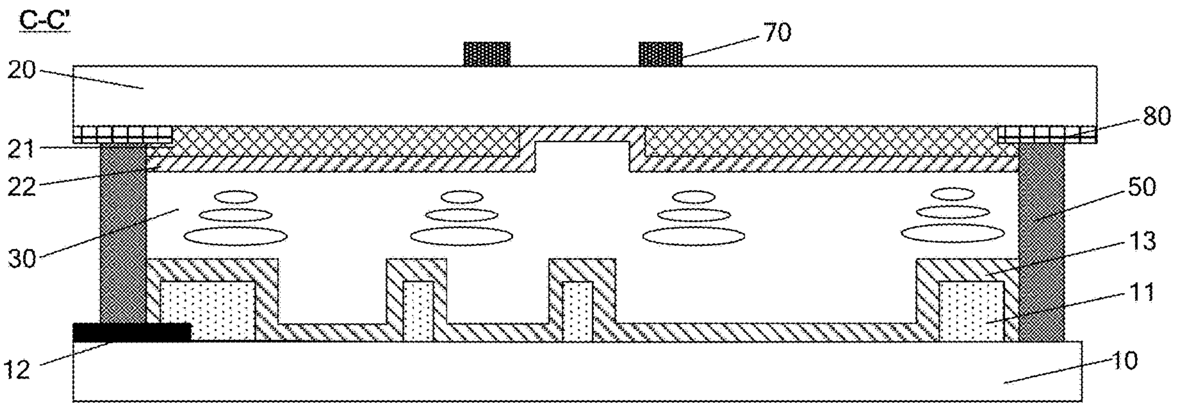
FIG. 14 is a cross-sectional view of the phase shifter shown in FIG. 13 taken along a line C-C'.
Figure 15:
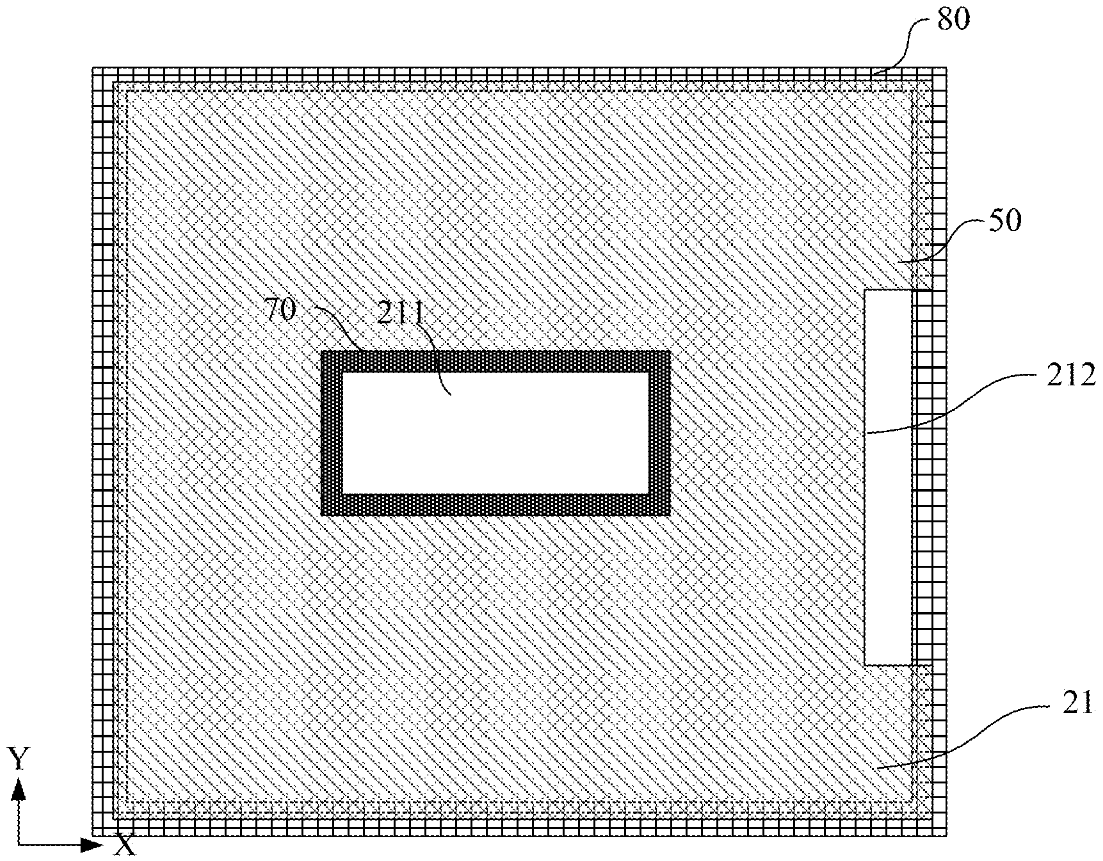
FIG. 15 is a plan view (on a side of a transmission line) of a second substrate in the phase shifter shown in FIG. 13.

FIG. 13 is a schematic diagram showing another phase shifter according to an embodiment of the present disclosure, FIG. 14 is a cross-sectional view of the phase shifter shown in FIG. 13 taken along a line C-C', and FIG. 15 is a plan view (on the side of the transmission line 11) of the second substrate of the phase shifter shown in FIG. 13. As shown in FIGS. 13 to 15, in some embodiments, the second substrate not only includes the ground electrode 21 and the second alignment layer in FIG. 9, but also includes an isolation structure 80 disposed in the peripheral region and surrounding the microwave transmission region. In the embodiment of the present disclosure, the arrangement of the isolation structure 80 can prevent the microwave signal transmitted in the microwave transmission region from being interfered by the external RF signal.

Figure 16:
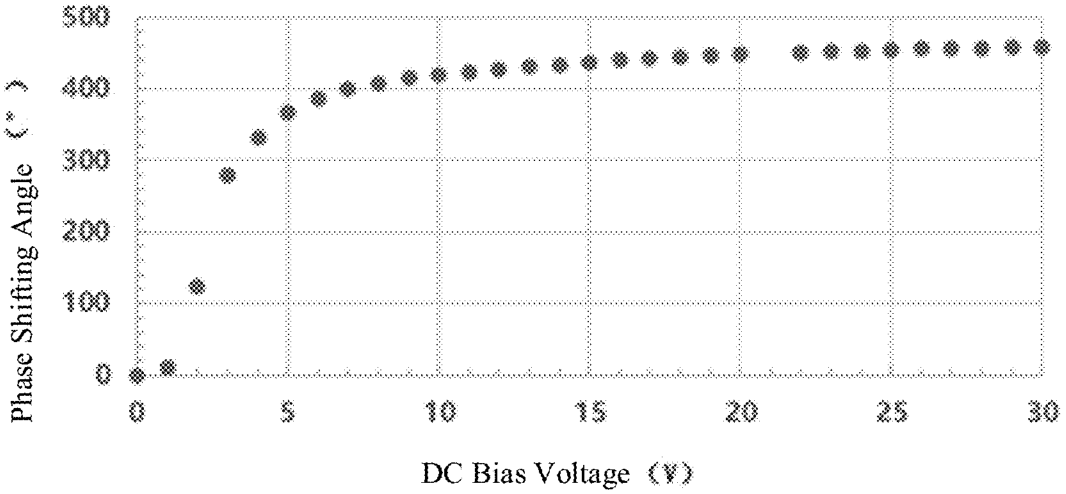
FIG. 16 is a measured curve of a phase shift angle and DC bias voltage of the phase shifter shown in FIG. 13.

FIG. 16 is a measured graph of phase shift angle and DC bias voltage for the phase shifter of FIG. 13. As shown in FIG. 16, when the voltage applied to the bias line 12 is 8V or above, the phase shifter can achieve a phase shift angle greater than 360°, and thus the phase shifter according to the embodiment of the present disclosure satisfies the requirement of the phased array antenna.

In some embodiments, since the external DC signal needs to be isolated by the isolation structure 80, the isolation structure 80 may be made of a high-resistance material including, but not limited to, any one of Indium Tin Oxide (ITO), nickel (Ni), tantalum nitride (TaN), chromium (Cr), indium oxide ($In_2O_3$), and tin oxide ($Sn_2O_3$), preferably, the ITO material. The isolation structure 80 has a thickness of about 30 nm to 2000 nm and a width of about 0.1 mm to 5 mm, and the specific thickness and width of the isolation structure 80 may be determined according to the size of the phase shifter, the size of the ground electrode 21, and the like.

In an embodiment, referring to FIG. 15, the isolation structure 80 is of an enclosed structure, and the isolation structure 80 is located on a side of the ground electrode 21 away from the liquid crystal layer 30. The ground electrode 21 contacts and overlaps the isolation structure 80, i.e., the isolation structure 80 and the ground electrode 21 are shorted together. The ground electrode 21 has a groove 212 at a side edge thereof, and an orthographic projection of the groove 212 on the second base substrate 20 overlaps at least a portion of an orthographic projection of the isolation structure 80 on the second base substrate 20, so that a portion of the isolation structure 80 corresponding to the groove 212 can be bound to the second connection pad on the second wiring board to supply the ground signal to the ground electrode 21 and the isolation structure 80.

For example, the ground electrode 21 has a rectangular outline, and has a first side, a second side, a third side, and a fourth side connected in sequence. In this case, a groove 212 may be formed on any one of the first side (i.e., the left side), the second side (i.e., the upper side), the third side (i.e., the right side), and the fourth side (i.e., the lower side). As an example, the groove 212 is formed on the third side in FIG. 15.

In some embodiments, the ground electrode 21 is made of a metal material, such as any one of copper, aluminum, gold, and silver. The thickness of the ground electrode 21 is about 0.1 μm to 100 μm. Parameters such as specific material and thickness of the ground electrode 21 may be specifically determined according to the size and performance requirements of the phase shifter.

In some embodiments, the phase shifter not only includes the above structure, but also includes a support structure 40, a frame sealing adhesive 50, and the like. The frame sealing adhesive 50 is disposed between the first substrate and the second substrate, located in the peripheral region, surrounds the microwave transmission region, and is configured to seal a liquid crystal cell of the phase shifter. The support structure 40 is disposed between the first substrate and the second substrate. A plurality of support structures may be provided, and the support structures are disposed at intervals in the microwave transmission region to maintain the cell thickness of the liquid crystal cell.

In some embodiments, the supporting structure 40 in the embodiments of the present disclosure may be made of an organic material and have a certain elasticity, so that it is possible to prevent the first base substrate 10 and the second base substrate 20 from being damaged by an external force when the phase shifter is pressed. Further, appropriate spherical particles may be added to the support structure 40, and the spherical particles can ensure the stability of the support structure 40 during maintenance of the cell thickness.

In some embodiments, the bias line 12 is made of a high resistance material. When a DC bias is applied to the bias line 12, the electric field formed by the bias line and the ground electrode 21 may only drive the liquid crystal molecules of the liquid crystal layer 30 to deflect, and for the microwave signal transmitted by the phase shifter, it is equivalent to an open circuit, that is, the microwave signal is transmitted only along the transmission line 11. The conductivity of bias line 12 is less than 14500000 siemens/m, and the bias line 12 having a lower conductivity value is preferably selected according to the size of the phase shifter and the like. In some embodiments, the material of the bias line 12 includes, but is not limited to, any one of Indium Tin Oxide (ITO), nickel (Ni), tantalum nitride (TaN), chromium (Cr), indium oxide ($In_2O_3$), and tin oxide ($Sn_2O_3$). Preferably, the bias line 12 is made of ITO.

In some embodiments, the transmission line 11 is made of a metal material, including but not limited to, aluminum, silver, gold, chromium, molybdenum, nickel, or iron. A pitch of the transmission line 11 is a distance from a point on the transmission line 11, the point having a normal line with the normal line being intersected with other portions of the transmission line 11, to the closest one of the intersections of the normal line and the other portions of the transmission line 11. That is, dl shown in FIG. 8 represents the pitch of the transmission line 11. In some embodiments, the line width of the transmission line 11 is about 100 μm to 3000 μm, the pitch of the transmission line 11 is about 100 μm to 2 mm, and the thickness of the transmission line 11 is about 0.1 μm to 100 μm.

In some embodiments, the transmission line 11 is a delay line, and the corner of the delay line is not equal to 90°, so as to avoid the microwave signal from being reflected at the corner of the delay line and in turn the loss of the microwave signal.

In some embodiments, the first base substrate 10 may be made of a plurality of materials, for example, if the first base substrate 10 is a flexible substrate, the material of the first base substrate 10 may include at least one of polyethylene glycol terephthalate (PET) and Polyimide (PI). If the first base substrate 1011 is a rigid substrate, the material of the first base substrate 10 may also be glass, and the like. The thickness of the first base substrate 10 may be about 0.1 mm to 1.5 mm. The second base substrate 20 may also be made of various materials, for example, if the second base substrate 20 is a flexible substrate, the material of the second base substrate 20 may include at least one of polyethylene glycol terephthalate (PET) and Polyimide (PI). If the second base substrate 20 is a rigid substrate, the material of the second base substrate 20 may also be glass, and the like. The thickness of the second base substrate 20 may be about 0.1 mm to 1.5 mm. Of course, the first base substrate 10 and the second base substrate 20 may be made of other materials, which is not limited herein. The specific thicknesses of the first and second substrates 10 and 20 may also be determined according to the skin depth of an electromagnetic wave (i.e., the RF signal).

In some embodiments, the thickness of the liquid crystal layer 30 is about 1 μm to 1 mm. Of course, the thickness of the liquid crystal layer 30 may be specifically determined according to the size of the phase shifter and the requirements of the phase shifting angle. In addition, the liquid crystal layer 30 in the embodiment of the present disclosure is made of a microwave liquid crystal material. For example, the liquid crystal molecules in the liquid crystal layer 30 are positive liquid crystal molecules or negative liquid crystal molecules. It should be noted that, when the liquid crystal molecules are positive liquid crystal molecules, an included angle between a long axis direction of the liquid crystal molecules and the second electrode in the embodiment of the present disclosure is greater than 0° and less than or equal to 45°. When the liquid crystal molecules are negative liquid crystal molecules, an included angle between the long axis direction of the liquid crystal molecules and the second electrode is larger than 45° and smaller than 90°, so that the dielectric constant of the liquid crystal layer 30 changes after the liquid crystal molecules are deflected, and the purpose of the phase shifting is achieved.

In some embodiments, each of the first alignment layer 13 and the second alignment layer may be made of a polyimide-based material. The thickness of each of the first alignment layer 13 and the second alignment layer is about 30 nm to 2 μm.

Figure 17:
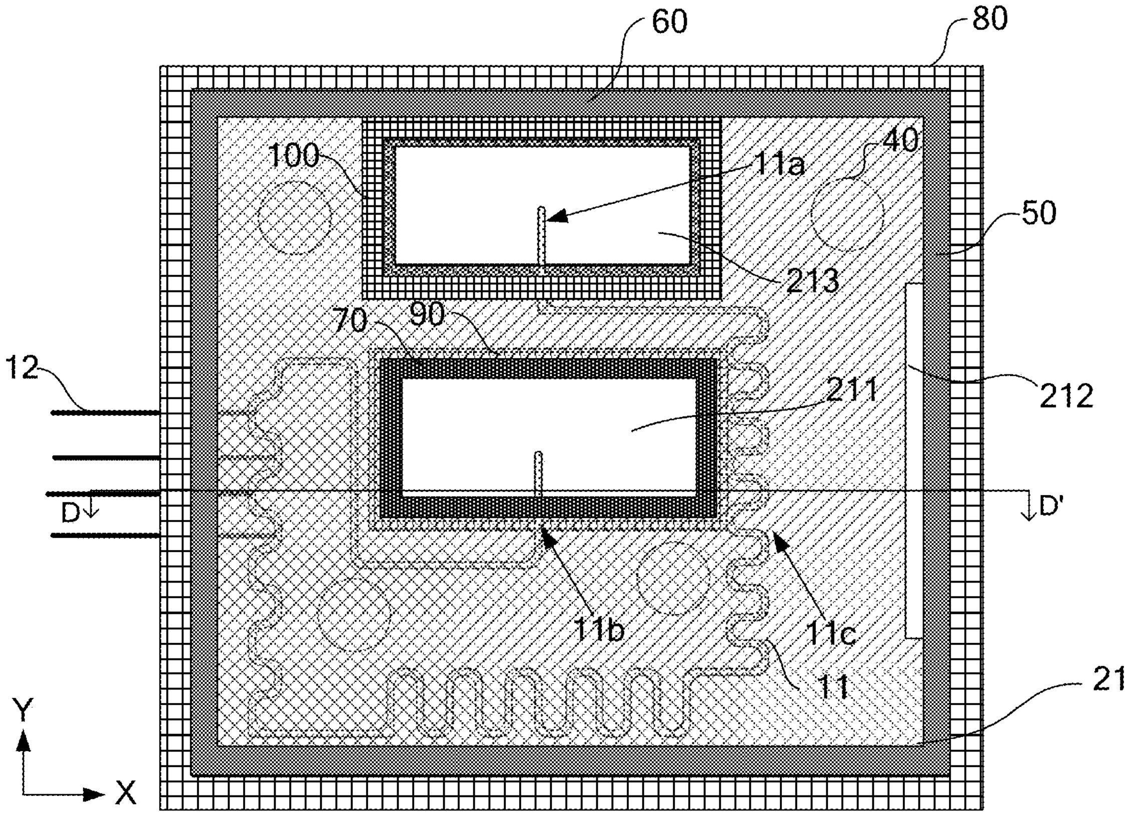
FIG. 17 is a schematic diagram showing another phase shifter according to an embodiment of the present disclosure.
Figure 18:
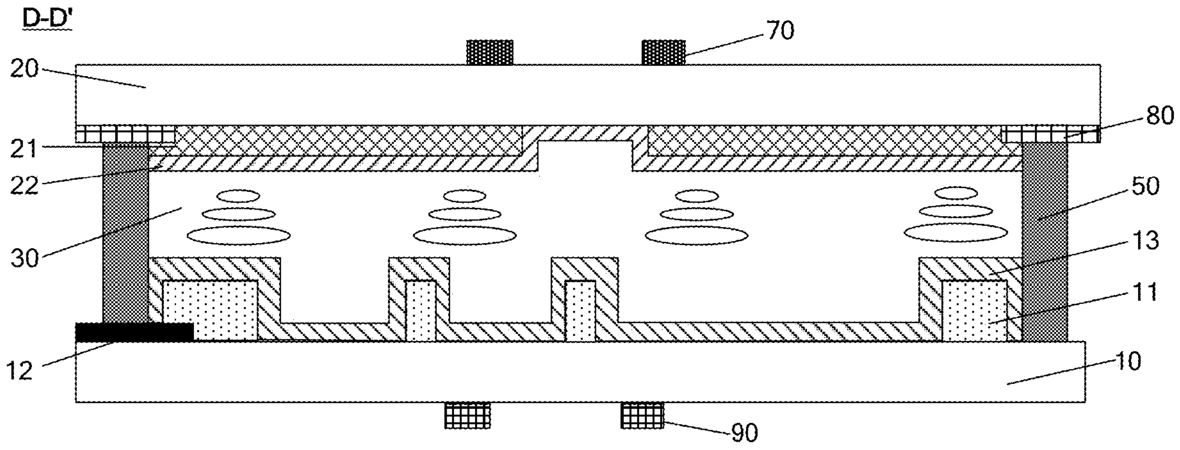
FIG. 18 is a sectional view of the phase shifter shown in FIG. 17 taken along a line D-D'.
Figure 19:
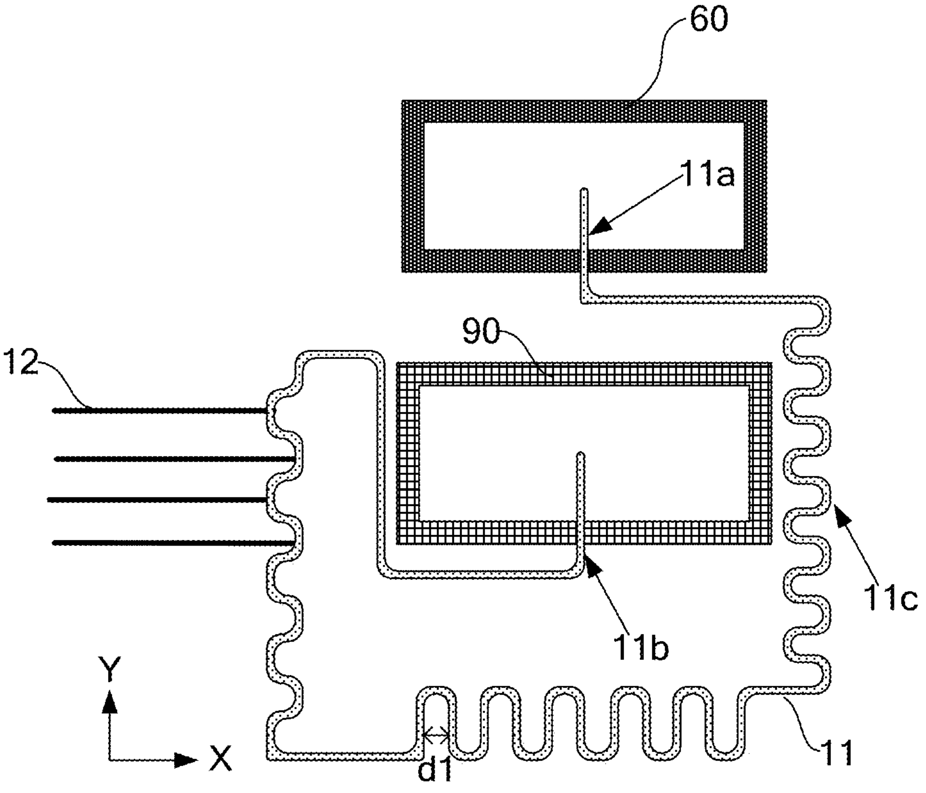
FIG. 19 is a plan view (on a side of a transmission line) of a first substrate in the phase shifter shown in FIG. 17.
Figure 20:
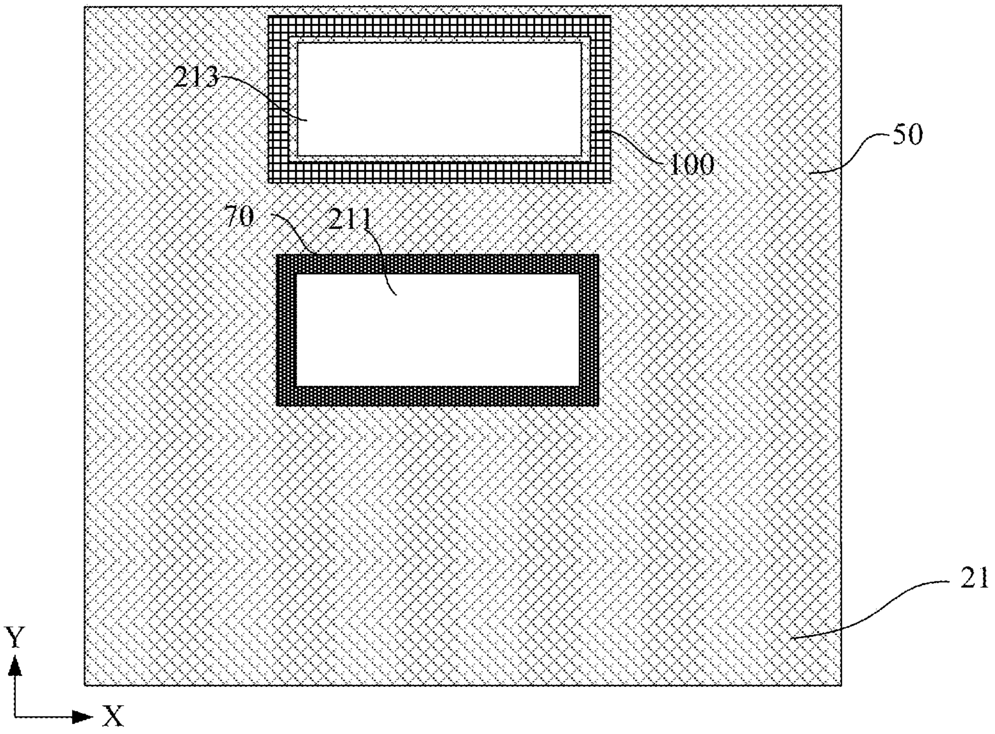
FIG. 20 is a plan view (on a side of a ground electrode) of a second substrate in the phase shifter shown in FIG. 17.

FIG. 17 is a schematic diagram showing another phase shifter of an embodiment of the present disclosure; FIG. 18 is a cross-sectional view of the phase shifter taken a line D-D' shown in FIG. 17; FIG. 19 is a plan view (on the side of the transmission line) showing the first substrate in the phase shifter shown in FIG. 17; and FIG. 20 is a plan view (on the side of the ground electrode) showing the second substrate of the phase shifter shown in FIG. 17. In some embodiments, as shown with reference to FIGS. 17 to 20, the phase shifter not only includes the first substrate, the second substrate, the first waveguide structure 60, and the second waveguide structure 70 described above, but also includes a first reflective structure 90 and a second reflective structure 100. In addition, referring to FIGS. 17 and 20, the ground electrode 21 on the second substrate not only includes the first opening 211, but also includes a second opening 213. A length of the second opening 213 along the X direction is not less than a line width of the transmission line 11, and an orthographic projection of the second opening 213 on the first base substrate 10 does not overlap an orthographic projection of the first opening 211 on the first base substrate 10. In some embodiments, an orthographic projection of the first transmission terminal 11*a* of the transmission line 11 on the first base substrate 10 at least partially overlaps an orthographic projection of the second opening 213 on the first base substrate 10, and an extension direction of the orthographic projection of the first transmission terminal 11*a* on the first base substrate 10 penetrates through a center of the orthographic projection of the second opening 213 on the first base substrate 10. With reference to FIG. 17, the first reflective structure 90 is disposed on a side of the first base substrate 10 away from the liquid crystal layer 30, and an orthographic projection of the first reflective structure 90 on the first base substrate 10 at least covers an orthographic projection of the first opening 211 on the first base substrate 10, and an orthographic projection of the second reflective structure 100 on the first base substrate 10 at least covers an orthographic projection of the second opening 213 on the first base substrate 10. In this case, when the first waveguide structure 60 feeds the microwave signal into the first transmission terminal 11*a* of the transmission line 11 in a coupling manner, the microwave signal is transmitted between the transmission line 11 and the ground electrode 21, and is fed out of the phase shifter in a coupling manner via the second waveguide structure 70 and the second transmission terminal 11*b*. In the embodiment of the present disclosure, the second reflective structure 100 is disposed on a side of the second base substrate 20 away from the liquid crystal layer 30. When the microwave signal is fed in via the first transmission terminal 11*a*, the second reflective structure 100 can reflect the microwave signal, so as to ensure that the microwave signal propagates in the phase shifter, thereby avoiding the loss of the microwave signal. Similarly, when the second transmission terminal 11*b* serves as an input terminal for the microwave signal and the first transmission terminal 11*a* serves as an output terminal for the microwave signal, the first reflective structure 90 can also enable that the microwave signal propagates in the phase shifter, thereby avoiding the loss of the microwave signal.

In some embodiments, the first reflective structure 90 may adopt a waveguide structure. The waveguide cavity of the first reflective structure 90 has a first port and a second port. The first port of the first reflective structure 90 faces the first port of the second waveguide structure, and an orthographic projection of the first port of the first reflective structure 90 on the first base substrate at least partially overlaps or completely overlaps an orthographic projection of the first port of the second waveguide structure 70 on the first base substrate 10. The second reflective structure 100 may also adopt a waveguide structure. The waveguide cavity of the second reflective structure 100 has a first port and a second port. The first port of the second reflective structure 100 faces the first port of the first waveguide structure 60, and an orthographic projection of the first port of the second reflective structure 100 on the second base substrate 20 at least partially overlaps or completely overlaps an orthographic projection of the first port of the first waveguide structure 60 on the second base substrate 20. It should be noted that, in the embodiment of the present disclosure, the first port of the first reflective structure 90 may also cover the first substrate, and the first port of the second reflective structure 100 may also cover the second substrate, that is, the first reflective structure 90 and the second reflective structure 100 may define the phase shifter therebetween. In addition, as long as an orthographic projection of the first port of the first reflective structure 90 on the second base substrate 20 covers an orthographic projection of the first opening 211 of the ground electrode 21 on the second base substrate 20, and an orthographic projection of the first port of the second reflective structure 100 on the first base substrate 10 covers an orthographic projection of the second opening 213 of the ground electrode 21 on the first base substrate 10, it falls within the scope of the embodiments of the present disclosure.

In some embodiments, the first opening 211 and the second opening 213 of the ground electrode 21 have the same size, that is, a length of the first opening 211 along the X direction is equal to a length of the second opening 213 along the X direction, and a length of the first opening 211 along the Y direction is equal to a length of the second opening 213 along the Y direction.

In some embodiments, an orthographic projection of the second opening 213 of the ground electrode on the first base substrate 10 completely overlaps an orthographic projection of the first port of the first waveguide structure 60 on the first base substrate 10. It should be noted that, as long as an orthographic projection of the first port of the second waveguide structure 70 on the first base substrate 10 covers an orthographic projection of the second opening 211 of the ground electrode 21 on the first base substrate 10, it falls into the scope of the embodiment of the present disclosure, thereby reducing the insertion loss of the microwave signal.

In some embodiments, when the transmission body portion 11*c* of the transmission line 11 includes at least one sinuous line, an orthographic projection of the second opening 213 of the ground electrode 21 on the first base substrate 10 does not overlap an orthographic projection of the at least one sinuous line on the first base substrate 10. For example, an orthographic projection of the second opening 213 of the ground electrode 21 on the first base substrate 10 does not overlap an orthographic projection of each of the sinuous lines on the first base substrate 10, thereby avoiding the loss of the microwave signal.

As a second aspect, an embodiment of the present disclosure provides a method for manufacturing a phase shifter, which may manufacture the phase shifter described above. The method includes the following steps S1 to S4.

At step S1, a first substrate is prepared.

At step S2, a second substrate is prepared.

At step S3, the first substrate and the second substrate are aligned together to form a cell, and liquid crystal molecules are filled between the first substrate and the second substrate to form a liquid crystal layer.

At step S4, a first waveguide structure is assembled on a side of the first substrate away from the liquid crystal layer, and a second waveguide structure is assembled on a side of the second substrate away from the liquid crystal layer.

In some embodiments, step S1 specifically includes steps S11 to S14.

At step S11, a pattern including a bias line is formed on a first base substrate through a patterning process.

Specifically, the first base substrate is cleaned and dried; a first high-resistance material layer is deposited on the first base substrate through a magnetron sputtering process, for example, an ITO material layer is coated; and photoresist coating, pre-baking, exposure, development, post-baking, dry or wet etching, annealing and crystallization processes are performed on the first high-resistance material layer to form the pattern including the bias line.

At step S12, a pattern including a transmission line is formed through a patterning process on the first base substrate on which the bias line is formed.

Specifically, the first base substrate on which the bias line is formed is cleaned and dried; a first metal material layer is deposited on a side of the bias line away from the first base substrate through a magnetron sputtering process, for example, an aluminum material layer is coated; and the photoresist coating, pre-baking, exposure, development, post-baking, dry etching or wet etching processes are performed on the first metal material layer to form the pattern including the transmission line.

At step S13, a first alignment layer is formed on the first base substrate on which the transmission line is formed.

Specifically, the first base substrate on which the transmission line is formed is cleaned and dried; a PI solution is printed on the first base substrate; the IP solution is heated to evaporate the solvent, and then thermally cured, rubbed, or photo-aligned to form the first alignment layer.

At step S14, a pattern including a support structure is formed through a patterning process on the first base substrate on which the first alignment layer is formed.

Specifically, an photoresist layer is formed through a spin coating or spray coating process on a side of the first alignment layer away from the first base substrate; and the pre-baking, exposure, development and post-baking processes are performed on the photoresist layer to form the pattern of the support structure. In addition, spherical particles can be sprayed in the photoresist layer.

Until now, the manufacture of the first substrate is finished.

In some embodiments, step S2 specifically includes steps S21 to S23.

At step S21, a pattern including an isolation structure is formed on the second base substrate through a patterning process.

Specifically, the second base substrate is cleaned and dried; a second high-resistance material layer is deposit on the second base substrate through a magnetron sputtering process, for example, an ITO material layer is coated; and the photoresist coating, pre-baking, exposure, development, post-baking, dry or wet etching, annealing and crystallization processes are performed on the second high-resistance material layer to form the pattern including the isolation structure.

At step S22, a pattern including a ground electrode is formed through a patterning process on the base substrate on which the isolation structure is formed.

Specifically, the second base substrate on which the isolation structure is formed is cleaned and dried; a second metal material layer is deposited through a magnetron sputtering process on a side of the isolation structure away from the first base substrate, for example, an aluminum material layer is coated; and the photoresist coating, pre-baking, exposure, development, post-baking, dry etching or wet etching processes are performed on the second metal material layer to form the pattern including the ground electrode.

At step S23, a second alignment layer is formed on the second base substrate on which the transmission line is formed.

Specifically, the second base substrate on which the ground electrode is formed is washed and dried; a PI solution is printed on the second base substrate; and the PI solution is heated to evaporate the solvent, and then thermally cured, rubbed or photo-aligned to form the second alignment layer.

Until now, the manufacture of the second substrate is finished.

In some embodiments, step S3 may specifically include steps S31 and S32.

At step S31, a frame sealing adhesive is formed on the first substrate, and a liquid crystal layer is formed on the second substrate.

Specifically, the frame sealing adhesive is formed on a peripheral region of the first alignment layer of the first substrate; and liquid crystal molecules are dripped on the second alignment layer of the second substrate to form a liquid crystal layer. It should be noted that the frame sealing adhesive may also be formed on the peripheral region of the second alignment layer of the second substrate, and the liquid crystal molecules may be dripped on the first alignment layer of the first substrate to form the liquid crystal layer.

At step S32, the first substrate formed with the frame sealing adhesive thereon and the second substrate formed with the liquid crystal layer thereon are aligned to form a cell.

Specifically, the first substrate formed with the frame sealing adhesive thereon and the second substrate formed with the liquid crystal layer thereon are conveyed to a vacuum chamber for alignment and vacuum lamination, and then the liquid crystal cell is formed through ultraviolet curing and thermal curing processes.

In addition, step S3 can be implemented not only with steps S31 and S32 described above, but also be implemented as follows. The prepared first substrate and the second substrate are aligned; a certain space between the first substrate and the second substrate is supported by the frame sealing adhesive to form the liquid crystal layer; and a filling opening is formed on the frame sealing adhesive. The liquid crystal molecules are filled between the first substrate and the second substrate through the filling opening to form the liquid crystal layer; and then the filling opening is sealed to form the liquid crystal cell.

Of course, the method further includes a cutting step after the liquid crystal cell is formed. A portion of the first base substrate corresponding to the bias line is exposed, such that the first wiring board can be bonded to the bias line via the first connection pad to supply a DC bias voltage to the transmission line. Correspondingly, a portion of the second base substrate corresponding to the isolation structure is exposed, such that the second wiring board is bound to the isolation structure via the second connection pad to supply the ground signal to the ground electrode.

In some embodiments, specifically step S4 may include: performing a computer numerical control (CNC) process on a copper or aluminum ingot to form a hollow waveguide structure, that is, the first waveguide structure and the second waveguide structure; and then, electroplating a thin gold layer on the inner walls of the first waveguide structure and the second waveguide structure for oxidation prevention, that is, a protective layer is formed on the inner walls of the first waveguide structure and the second waveguide structure; finally, assembling the resulted first waveguide structure on a side of the first base substrate away from the liquid crystal layer, and assembling the resulted second waveguide structure on a side of the second base substrate away from the liquid crystal layer.

As a third aspect, an embodiment of the present disclosure provides an antenna, which may be a receiving antenna or a transmission antenna.

In the embodiment of the present disclosure, the receiving antenna is taken as an example for illustration. The antenna includes any one of the phase shifters and a patch electrode on a side of the first base substrate away from the ground electrode. A first opening is formed at a portion of the ground electrode corresponding to the patch electrode. The patch electrode is configured to feed the microwave signal into the liquid crystal layer of the phase shifter via the first opening of the ground electrode.

In addition, in an embodiment of the present disclosure, a plurality of antennas are arranged in an array to form a phased array antenna. For each of the antennas, a microwave signal is fed into a space between the transmission line and the ground electrode through the first waveguide structure to shift the phase of the microwave signal, and the phase-shifted microwave signal is radiated out of the phase shifter through the second waveguide structure, that is, the first waveguide structure and the second waveguide structure serve as feeding structures of the phase shifter. Since each of the first waveguide structure and the second waveguide structure employs a metal hollow structure, air gaps are not easily generated during the assembling process of the phase shifter, therefore the coupling efficiency of the microwave signal can be effectively improved, and meanwhile when the phase shifter in the embodiment of the present disclosure is applied to a liquid crystal phased array antenna, the consistency of the amplitudes among various channels of the antenna can be improved, and the insertion loss can be reduced.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and essence of the present disclosure, which are also to be regarded as the scope of the present disclosure.

What is claimed is:

1. A phase shifter, comprising a first substrate, a second substrate and a first dielectric layer between the first substrate and the second substrate, wherein the first substrate comprises a first base substrate and a transmission line on a side of the first base substrate proximal to the first dielectric layer; the second substrate comprises a second base substrate and a reference electrode on a side of the second base substrate proximal to the first dielectric layer, an orthographic projection of the reference electrode on the first base substrate at least partially overlapping an orthographic projection of the transmission line on the first base substrate, wherein a first opening is in the reference electrode, and a length of the first opening along a first direction is not less than a line width of the transmission line, wherein the phase shifter has a microwave transmission region and a peripheral region surrounding the microwave transmission region; and the second substrate further comprises an isolation structure in the peripheral region on the second base substrate and surrounding the microwave transmission region.

2. The phase shifter of claim 1, wherein the transmission line comprises a first transmission terminal, a second transmission terminal, and a transmission body portion connected between the first transmission terminal and the second transmission terminal, each of the first transmission terminal and the second transmission terminal and the transmission body portion comprises a first port and a second port arranged oppositely, the first port of the first transmission terminal and the first port of the transmission body portion are electrically connected to each other, and the first port of the second transmission terminal and the second port of the transmission body portion are electrically connected to each other, and a direction from the first port to the second port of the first transmission terminal is the same as a direction from the first port to the second port of the second transmission terminal.

3. The phase shifter of claim 2, wherein an extension direction of an orthographic projection of the second transmission terminal on the first base substrate passes through a center of an orthographic projection of the first opening on the first base substrate.

4. The phase shifter of claim 2, wherein the transmission body portion comprises at least one sinuous line electrically connected to the first transmission terminal and the second transmission terminal, an orthographic projection of the at least one sinuous line on the first base substrate has a portion intersecting an extension direction of an orthographic projection of the first transmission terminal on the first base substrate.

5. The phase shifter of claim 4, wherein the at least one sinuous line comprises a plurality of sinuous lines, and at least a portion of the plurality of sinuous lines is different in shape, or an orthographic projection of the first opening on the first base substrate does not overlap the orthographic projection of the at least one sinuous line on the first base substrate.

6. The phase shifter of claim 1, wherein a ratio of a length of the first opening along the first direction to a length of the first opening along a second direction is in a range from 1.7:1 to 2.3:1, and the first direction is perpendicular to the second direction.

7. The phase shifter of claim 2, wherein a second opening is in the reference electrode, a length of the second opening along the first direction is not less than the line width of the transmission line, and an orthographic projection of the second opening on the first base substrate does not overlap an orthographic projection of the first opening on the first base substrate.

8. The phase shifter of claim 7, wherein an orthographic projection of the first transmission terminal on the first base substrate at least partially overlaps the orthographic projection of the second opening on the first base substrate, and an extension direction of the orthographic projection of the first transmission terminal on the first base substrate passes through a center of the orthographic projection of the second opening on the first base substrate.

9. The phase shifter of claim 8, wherein the length of the second opening along the first direction is the same as the length of the first opening along the first direction, and a length of the second opening along a second direction is the same as a length of the first opening along the second direction, the first direction being perpendicular to the second direction, or the orthographic projection of the second opening on the first base substrate does not overlap an orthographic projection of the transmission body portion of the transmission line on the first base substrate.

10. The phase shifter of claim 9, further comprising: a first waveguide structure and a second waveguide structure; wherein the first waveguide structure is configured to transmit a microwave signal in a coupling manner with the first transmission terminal of the transmission line through the second opening, the second waveguide structure is configured to transmit a microwave signal in a coupling manner with the second transmission terminal of the transmission line through the first opening.

11. The phase shifter of claim 10, wherein a first port of the first waveguide structure is on a side of the first base substrate away from the first dielectric layer; a first port of the second waveguide structure is on a side of the second base substrate away from the first dielectric layer, the extension direction of the orthographic projection of the first transmission terminal on the first base substrate passes through a center of an orthographic projection of the first port of the first waveguide structure on the first base substrate; and an extension direction of an orthographic projection of the second transmission terminal on the second base substrate passes through a center of an orthographic projection of the first port of the second waveguide structure on the second base substrate.

12. The phase shifter of claim 11, wherein a distance between the orthographic projection of the first transmission terminal on the first base substrate and the center of the orthographic projection of the first port of the first waveguide structure on the first base substrate is less than a preset value; and a distance between the orthographic projection of the second transmission terminal on the second base substrate and the center of the orthographic projection of the first port of the second waveguide structure on the second base substrate is less than a preset value.

13. The phase shifter of claim 10, wherein the first waveguide structure comprises a rectangular waveguide structure and has an aspect ratio in a range from 1.7:1 to 2.3:1 in cross-sectional view, and the second waveguide structure comprises a rectangular waveguide structure and has an aspect ratio in a range from 1.7:1 to 2.3:1 in cross-sectional view, or the orthographic projection of the first port of the first waveguide structure on the first base substrate completely overlaps the orthographic projection of the first opening on the first base substrate, and the orthographic projection of the first port of the second waveguide structure on the second base substrate completely overlaps an orthographic projection of the second opening on the second base substrate.

14. The phase shifter of claim 1, wherein the isolation structure is on a side of the reference electrode proximal to the second base substrate, and the reference electrode extends to the peripheral region and contacts and overlaps the isolation structure.

15. The phase shifter of claim 14, wherein the reference electrode comprises a groove in the peripheral region and an orthographic projection of the groove on the second base substrate overlaps an orthographic projection of the isolation structure on the second base substrate.

16. The phase shifter of claim 1, wherein for a point on the transmission line, the point having a normal line with the normal line being intersected with other portions of the transmission line, a distance from the point to a closest one of the intersections with the other portions of the transmission line is in a range from 100 μm to 2 mm, or a material of the first dielectric layer comprises a liquid crystal.

17. The phase shifter of claim 13, wherein a protective layer is on an inner wall of a hollow cavity of the first waveguide structure and a protective layer is on an inner wall of a hollow cavity of the second waveguide structure, or a filling medium is in a hollow cavity of the first waveguide structure, and a filling medium is in a hollow cavity of the second waveguide structure, and the filling medium comprises polytetrafluoroethylene.

18. An antenna, comprising the phase shifter of claim 1.

19. The antenna of claim 18, further comprising a patch electrode on a side of the second base substrate away from the first dielectric layer, wherein an orthographic projection of the patch electrode on the second base substrate overlaps an orthographic projection of the first opening on the second base substrate.

* * * * *